Figure 1:
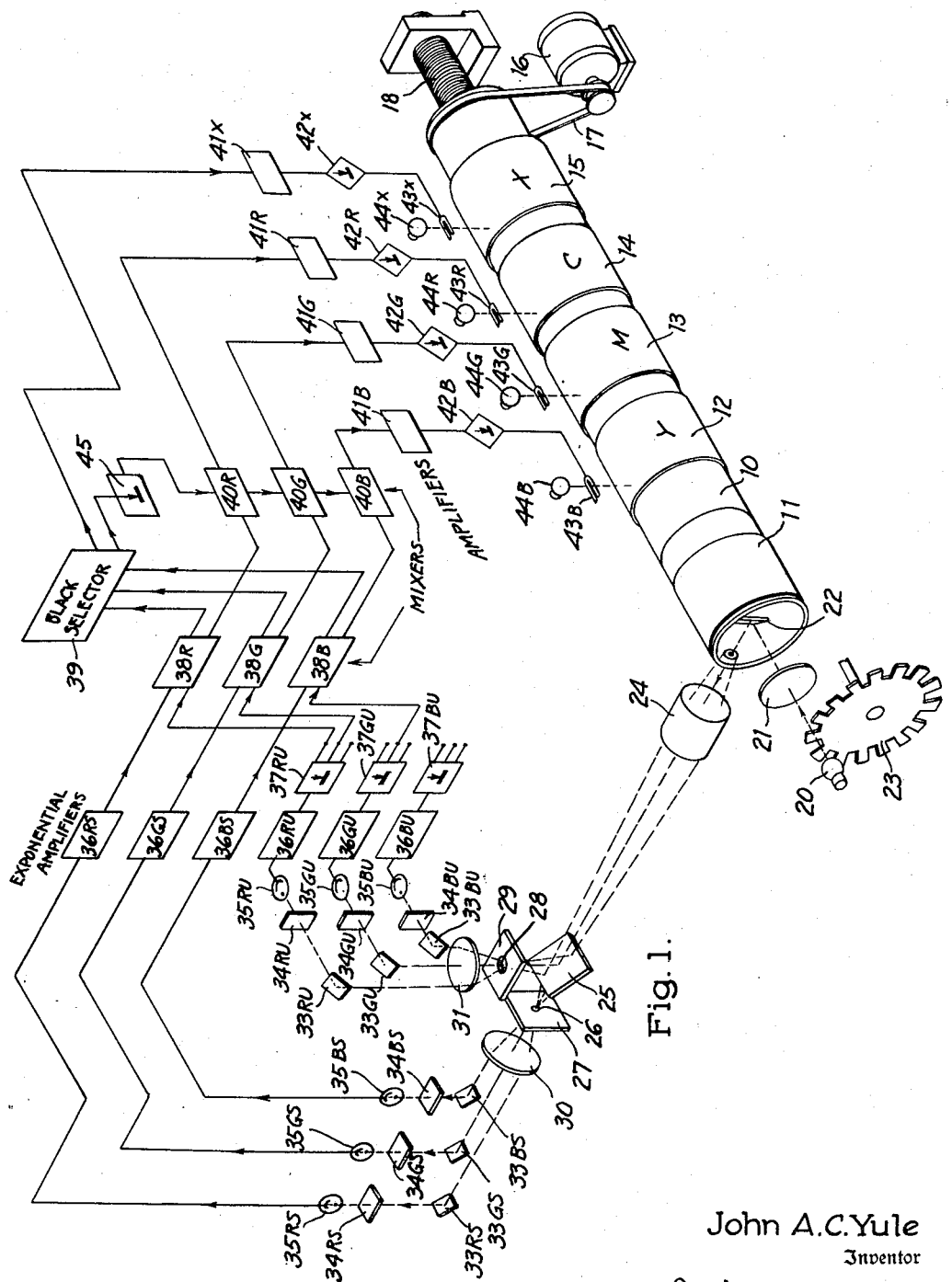

Oct. 12, 1954     J. A. C. YULE     2,691,696
ELECTROOPTICAL UNSHARP MASKING IN COLOR REPRODUCTION
Filed Oct. 27, 1950     7 Sheets-Sheet 1

John A. C. Yule
Inventor

Daniel I. Mayne
F. M. Emerson Holmes
Attorneys

Oct. 12, 1954    J. A. C. YULE    2,691,696
ELECTROOPTICAL UNSHARP MASKING IN COLOR REPRODUCTION
Filed Oct. 27, 1950    7 Sheets-Sheet 2

John A. C. Yule
Inventor

Oct. 12, 1954  J. A. C. YULE  2,691,696
ELECTROOPTICAL UNSHARP MASKING IN COLOR REPRODUCTION
Filed Oct. 27, 1950  7 Sheets-Sheet 3

John A. C. Yule
Inventor

Attorneys

Oct. 12, 1954          J. A. C. YULE          2,691,696
ELECTROOPTICAL UNSHARP MASKING IN COLOR REPRODUCTION

Filed Oct. 27, 1950          7 Sheets-Sheet 4

John A. C. Yule
Inventor

Oct. 12, 1954  J. A. C. YULE  2,691,696
ELECTROOPTICAL UNSHARP MASKING IN COLOR REPRODUCTION
Filed Oct. 27, 1950  7 Sheets-Sheet 5

John A. C. Yule
Inventor

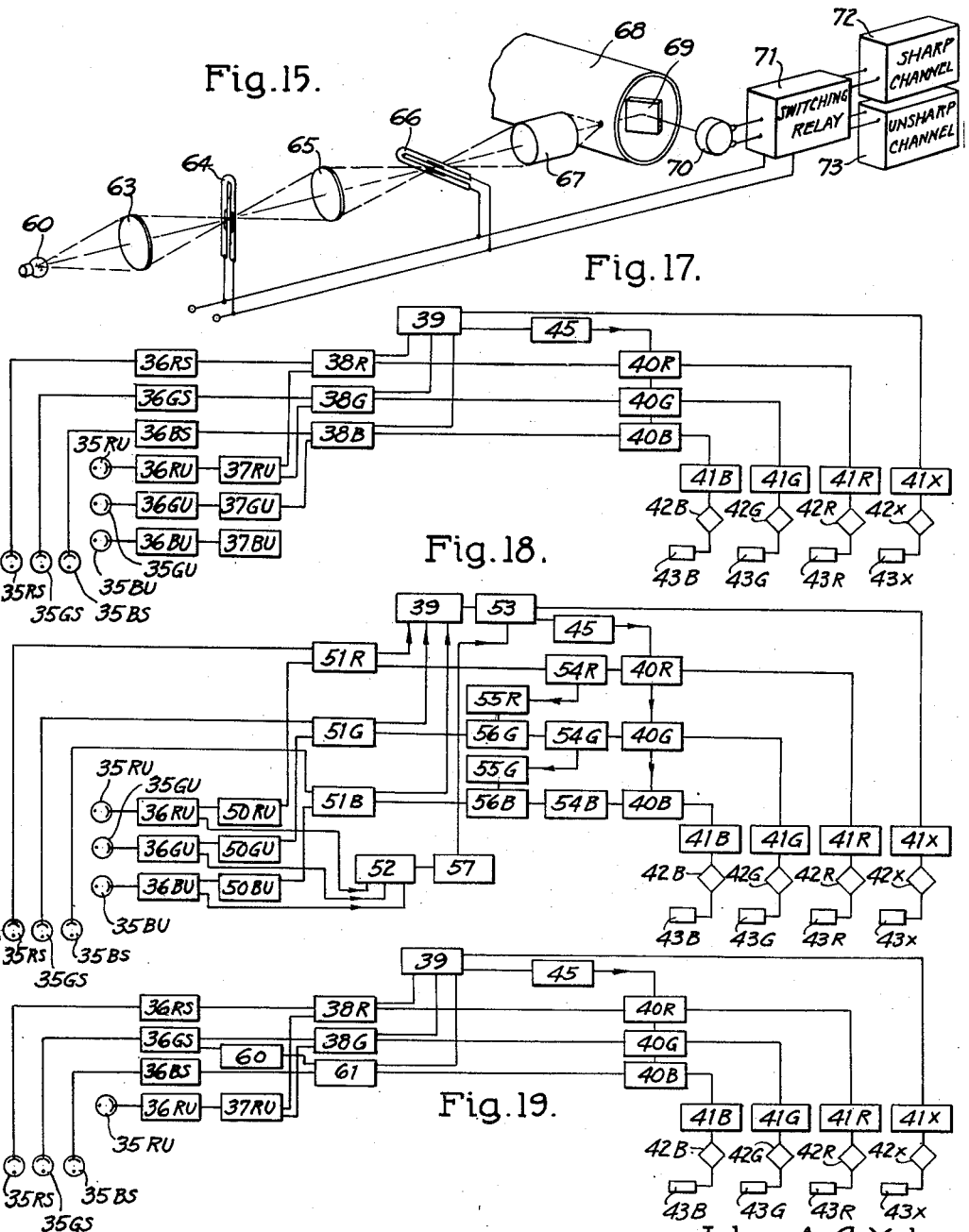

Oct. 12, 1954                J. A. C. YULE                2,691,696
         ELECTROOPTICAL UNSHARP MASKING IN COLOR REPRODUCTION
Filed Oct. 27, 1950                                7 Sheets-Sheet 7
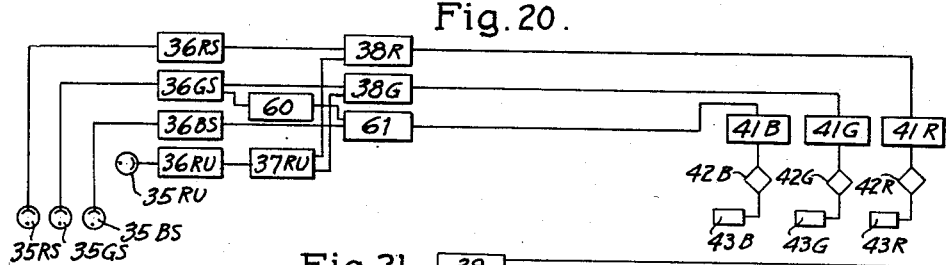
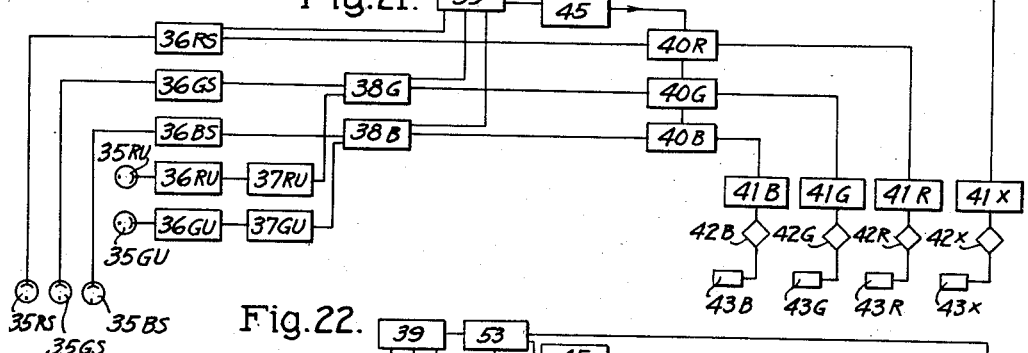
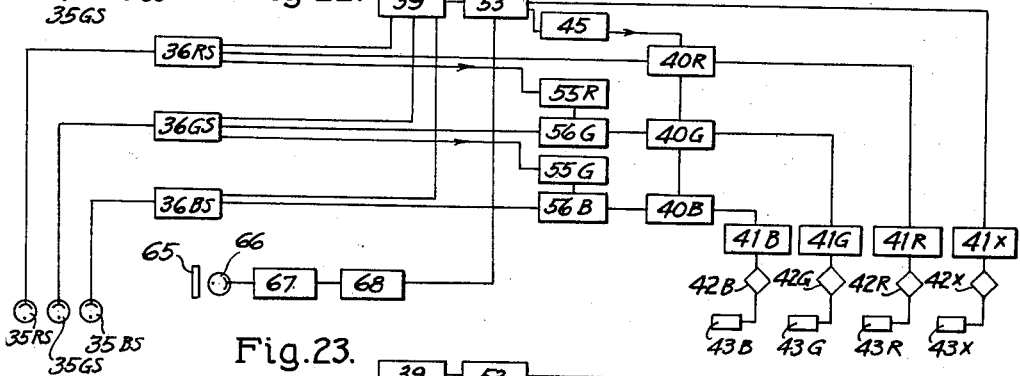
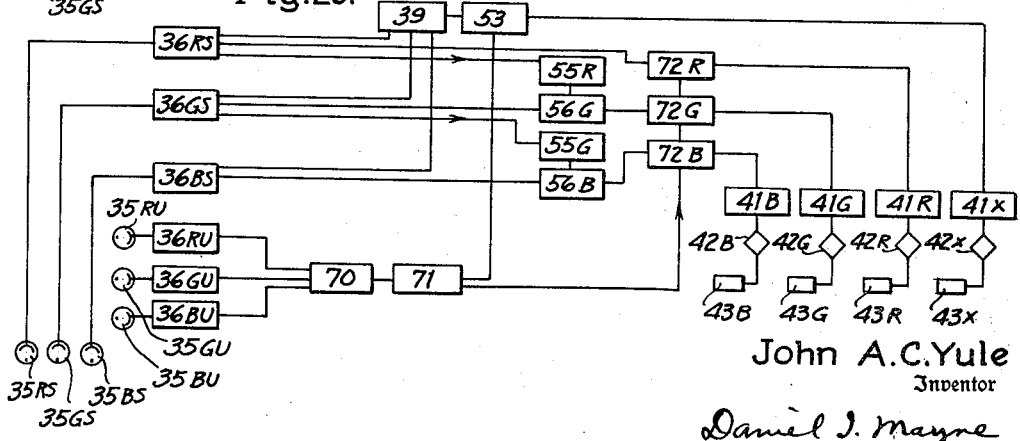
John A. C. Yule
Inventor Patented Oct. 12, 1954

2,691,696

UNITED STATES PATENT OFFICE 2,691,696

ELECTROOPTICAL UNSHARP MASKING IN COLOR REPRODUCTION

John A. C. Yule, Rochester, N. Y., assignor to Eastman Kodak Company, Rochester, N. Y., a corporation of New Jersey Application October 27, 1950, Serial No. 192,461

37 Claims. (Cl. 178—5.2)

This invention relates to photo reproduction processes involving optical scanning to provide electric signals, and reproduction controlled by the signals. It relates particularly to processes involving "masting" which term is now commonly used to describe the effect obtained by printing through two negatives, two positives or a positive and negative in register; the term is used no matter how the effect is obtained. U. S. 2,253,086, Murray and Morse, for example describes electro-optical "masking" although the physical sandwiching of negatives and positives does not actually occur. This generic use of the term "masking" is also adopted in the present specification; it stems from the analogy between electro-optical and straight photographic processes.

While the present invention finds its greatest use in color processes, it also enjoys utilization in black-and-white processes, and hence the invention will be described in general terms. "Unsharp" masking as now commonly used in photographic processes is accomplished by utilizing a first record which is sharp and in focus along with a second record (the mask) which is negative relative to the first one and is out of focus or is located out of focus, i. e., out of printing relation, when printing from the combination. The manner in which unsharp masking is utilized to provide improved definition, enhanced fine detail, and greater tolerance in mask registration is described in my U. S. Patent 2,420,636. My U. S. Patent 2,455,849 describes the manner in which an outline image is made from a continuous tone photograph by employing an unsharp mask, while my U. S. Patent 2,407,211 applies the principle to fine line reproduction work.

The masking method of color correction, in which a separation negative is bound with a low contrast positive of another primary color separation negative, is very well known and the above mentioned Murray and Morse patent is an example of electro-optical systems for obtaining equivalent effects. It is fortunate that color correction usually requires masking a negative by a positive or vice versa since this means that unsharp masking can simultaneously be effected, whereas it cannot be used in any process involving two negatives or two positives in register. Also a long series of Hall patents such as U. S. 2,231,669; 2,249,522; 2,286,730 describe electro-optical systems for the reproduction from multicolored transparencies in which color correction is introduced by the electrical equivalent of the masking method of color correction.

Many engaged in color press-printing employ the terms blue printer, red printer, yellow printer, and black printer to mean the plates to which the present specification refers to as cyan printer, magenta printer, yellow printer, and black printer respectively. The latter convention avoids confusion with the primary colors of the light filters used in obtaining the color separations.

Heretofore, the advantages of unsharp masking could only be obtained by time-consuming masking methods and could not be utilized with electro-optical systems for the photographic reproduction of transparencies.

It is an object of the invention to provide a method and apparatus whereby improved definition, enhanced detail, and other advantages of unsharp masking are obtained in the electro-optical reproduction of pictorial representations.

It is also an object of the invention to provide an improved electro-optical system for obtaining color separation negatives or positives from a color transparency which accomplishes both color correction and unsharp masking of the color transparency simultaneously.

It is a further object of the invention to provide apparatus which electro-optically simulates the use of unsharp masks in making the cyan, magenta, yellow, and black printer negatives of a four color photomechanical reproduction process.

The object of certain embodiments of the invention is to obtain unsharp masking in all four printer channels with a minimum of equipment for this special purpose, i. e., with a minimum of modification of the systems necessary for color correction anyway.

According to the present invention an image record (a positive or a negative) is scanned both "sharply" and "unsharply" to obtain electric signals corresponding, respectively, to the record which is masked and the unsharp or diffuse record which, in the photographic unsharp masking process, would be placed in optical register therewith.

The transparency or other record to be scanned constitutes a subject embodying visual intelligence in the form of variation in density or color. The term "sharp" scanning as used herein describes the point-to-point scanning of a transparency or other pictorial record by an elemental scanning spot capable of resolving fine detail in the transparency. "Unsharp" scanning connotes the point-to-point scanning of an image record by a slightly larger scanning spot which is capable of resolving only less fine detail. In general the larger spot includes the elemental scanning spot. For example, sharp scanning may be accomplished by focusing a pinhole source of light sharply upon the original, and unsharp scanning may simultaneously be accomplished by focusing a second source of light of somewhat larger area on the original so that the image of the larger source includes the image of the pinhole source on the original. The light from the elemental spot and from the larger spot as modified by the image record are transformed into electric signals in separate electric channels. The signals are representative of the variations in intelligence (density or color) in the original subject. The signal in the channel corresponding to the elemental spot (hereinafter referred to as the sharp channel) is then modified (either directly or by having two light valves in tandem) in accordance with the signal in the channel corresponding to the larger spot (hereinafter called the unsharp channel), and the modified signal is used to control the intensity of a scanning beam (or the modification is applied directly to the scanning beam) for exposing, in synchronism with the original scanning, a photo-sensitive material which, when developed, will constitute a record which has been exposed in a manner equivalent to unsharp masking.

In some embodiments of the invention scanning by an elemental spot and by a slightly larger spot including the elemental spot are accomplished simultaneously, and the light from the spots as modified by the image record is directed to separate photoelectric cells to establish electric energies in separate electric channels. In other embodiments a single scanning spot is alternately focused sharply and unsharply upon the image record, the light modified by the record is received by a single photoelectric cell, and the response of the cell is alternately switched to separate electric channels in synchronism with the sharp and unsharp focusing of the scanning spot in the image record.

The spots may be referred to as one of a given size (sharp) and the other slightly greater, or the unsharp spot may be defined first and the sharp spot considered as a portion thereof to represent finer details. The "unsharp" spot refers to the area thereof; this spot has just as sharp boundaries as does the "sharp" or small spot. The scanning signals are representative of the sharp and unsharp scanning, i. e. are representative of finely detailed variations and less finely detailed variations in density, color or other visual intelligence. This can also be described in reverse referring first to the coarsely detailed variations (the unsharp scanning). The optical system which defines the size of the scanning beams may be optically ahead of or optically after the subject being scanned and in general includes diaphragm means with apertures for providing beams of different sizes. Otherwise identical areas are scanned by scanning areas of different sizes.

In any of the embodiments the scanning beam or beams may be chopped or otherwise interrupted at a "carrier" frequency to permit A. C. amplification of the photoelectric signal. In certain "simultaneous" embodiments two different carrier frequencies are provided which are eventually used (as described later herein) to distinguish the signals. Both carrier frequencies must be higher than that corresponding to the scanning of the finest details which are to be resolved. For example if the finest details of the picture are about one tenth millimeter and the scanning covers 10 centimeters per second, the resolution frequency is about 1000 per second and the carrier frequencies should be greater than this so as not to interfere with the resolution. On the other hand, there are the "alternating" embodiments in which the sharp and unsharp signals alternate. The rate of alternation (the alternating frequency) is, in a sense, a carrier frequency (in fact, it can act as the carrier frequency for the A. C. amplification and modulation all as discussed below) and it too must be greater than the resolution frequency (i. e. the signal frequency from scanning finely detailed variations in the record) so as not to interfere with resolution.

When unsharp masking is to be accomplished simultaneously with color correction in electro-optical systems for the reproduction of colored originals, the light from the scanning beam as modified by the image record is passed through color filters and split to form a plurality of color separation components each carrying its corresponding intelligence. The intelligence of the various components is transformed into electrical energy, and at least one electric signal corresponding to one color component of the beam capable of resolving fine detail, i. e., of the sharp scanning beam, is modified in accordance with at least one electric signal corresponding to a color component of the beam capable of resolving only relatively coarse detail, i. e., the unsharp scanning beam. The range of masking factors which give satisfactory color correction is also adequate to provide the advantages of unsharp masking. Color correction and unsharp masking are thus simultaneously accomplished electro-optically by the modification of signals corresponding to the primary color components of the sharp scanning beam by the signals corresponding to the primary color components of the unsharp scanning beam. The electric signals as modified are the electrical equivalent of the variations in intensity of scanning beams transmitted through color separation negatives bound in register with unsharp separation positives of another color. They are also the equivalent of primary color beams transmitted through the original bound in register with a color correcting negative mask; various types of such negative masks are well known in straight photographic processes.

In four color work, one form of a black separation negative is made by utilizing the maximum of the signals after they are modified to control the intensity of a scanning beam for exposing a photosensitive layer. When the present invention is applied to the separate color signals, it carries over to the black signal and the sharpness of detail in such a black printer negative is considerably improved in comparison to the original image record. That is, the black printer signal will incorporate unsharp masking (without separate sharp and unsharp black channels) if each of the three color signals is unsharply masked before the black printer signal is selected. To obtain improved detail, it is more important for the black signal to be unsharply masked than for the three color signals; in fact, the blue signal (which is the one most masked for color correction) is of least importance for detail production since it controls the yellow printer. Yellow is unobtrusive in fine detail. However, the color signals do retain the unsharp effect or at least some of it even after any subsequent masking of the colors by black—a not uncommon practice. Theoretically, when an unsharply masked color signal is further masked by an unsharply masked black signal, the unsharp effect (enhanced detail) in the color signal might be reduced somewhat depending on which color is the basis of the black signal at that moment, but this second order effect is negligible.

Figure 2:
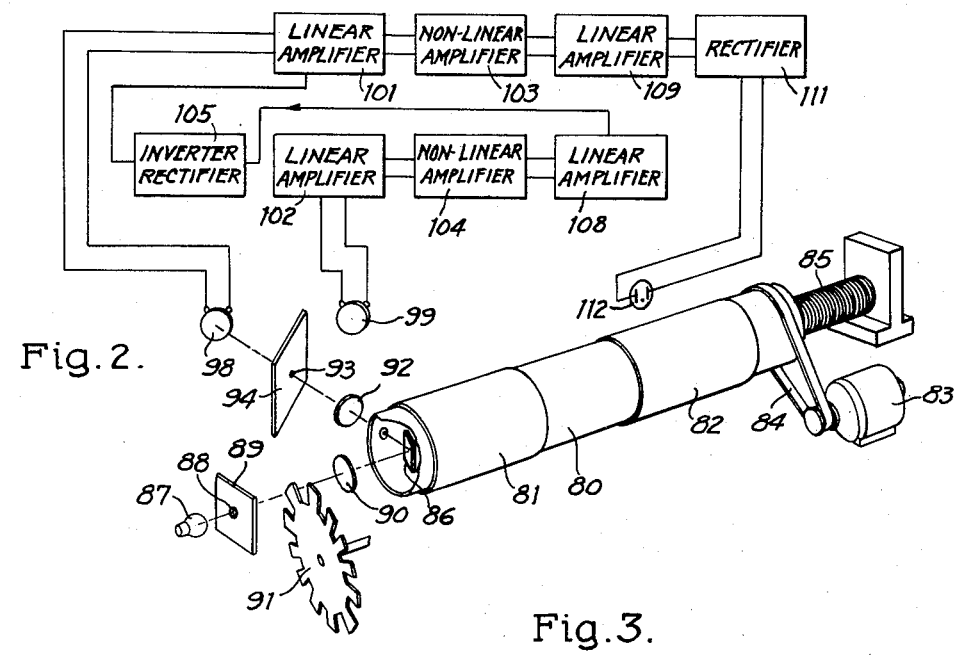
Figure 3:
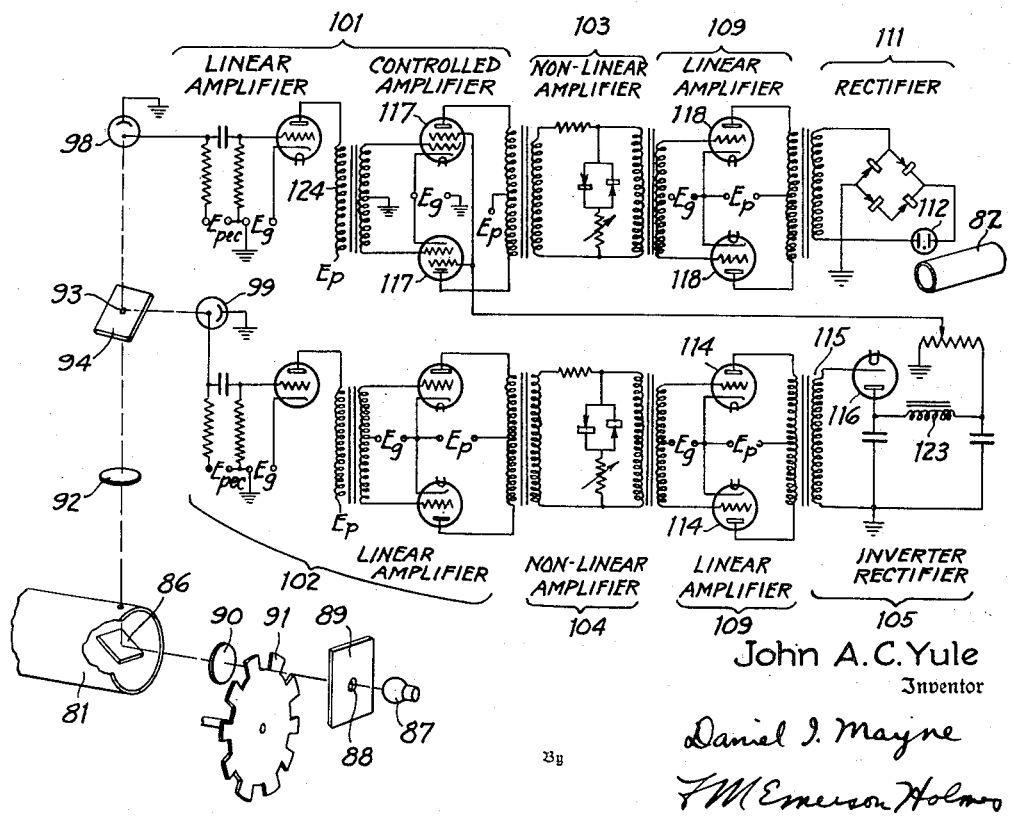
Figure 4:
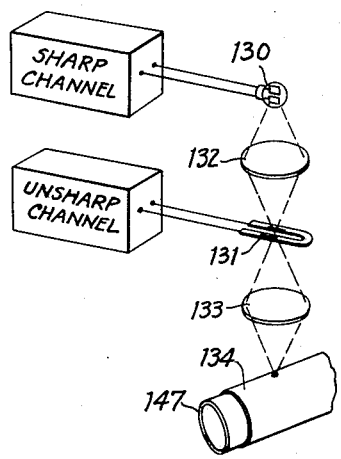
Figure 5:
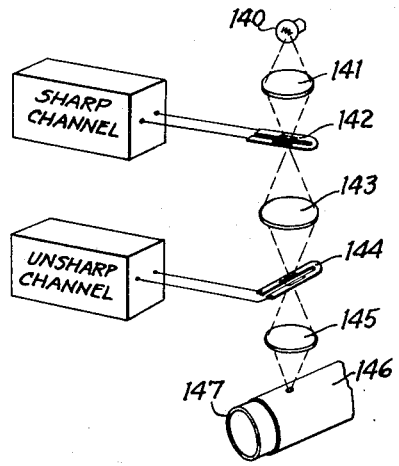

Other objects and advantages of the invention will be apparent from the following description when read in connection with the accompanying drawings in which:

Fig. 1 is a perspective schematic view of an embodiment of the invention which has considerable commercial value and which embraces color correction;

Figs. 2 and 3, using conventional symbols, illustrate the features of the embodiment shown in Fig. 1 which are essential to the present invention but not restricted to color reproduction;

Figs. 4 and 5 illustrate systems for modifying one signal by another alternative to that shown in Figs. 1, 2 and 3;

Figs. 6 to 10 inclusive illustrate alternative systems to establish the sharp and unsharp signals required by the invention;

Figs. 11 to 16 inclusive illustrate systems which establish the sharp and unsharp signals alternately but with high frequency; and Figs. 17 to 23 inclusive illustrate color correction systems with unsharp masking alternative to that shown in Fig. 1.

Mathematically photographic masking consists of the addition of densities, one of which is the density of a positive and the other of a negative. Over the straight line portion of any standard photo reproduction curve this is equivalent to the subtraction of quantities which are proportional to the logarithm of exposures (original reflectivities or original transmissions), the proportionality factor in each case is the gamma involved. It is similarly equivalent to the division of quantities proportional to exposures; these quantities are referred to as "linear" since they are not logarithmic, but to bring in the masking factor in terms of gammas, the quantities must be exponentially proportional to exposures at the time division takes place, i. e. proportional to exposures raised to the power gamma. When a negative and a positive are thus placed together in masking register, the contrast of the combination is equal to the difference of the individual contrasts (or gammas). The ratio of the individual contrasts is the "masking factor."

According to the aforementioned patents U. S. 2,253,086 to Murray and Morse, U. S. 2,249,522, and U. S. 2,286,730 to Hall, color correction is introduced in electro-optical systems by electrical modification of the energy in one color channel in accordance with the energy in another color channel to simulate the masking method of color correction. These "electrical modification" systems utilize converter or mixer tubes having two control grids capable of acting independently on the electron stream to obtain modification analogous to the reduction of contrast in ordinary masking. In U. S. Patent 2,286,730 Hall describes "optical modulation" using two light valves in optical tandem, i. e., two valves operating simultaneously on the same light beam, to accomplish the masking effect. Either system may be used with the present invention.

Unsharp masking finds its greatest use in connection with electro-optical processes for the reproduction of multicolored originals. The preferred embodiment of the invention shown in Fig. 1 illustrates an electro-optical system which simultaneously accomplishes both color correction and unsharp masking of a color transparency in the reproduction thereof. The transparency is simultaneously scanned by a first aperture corresponding to an elemental scanning area and by a second aperture which is sufficiently larger than the first to give the desired degree of unsharpness. This embodiment employs a four-color process which uses a black printer, in addition to the magenta, yellow, and cyan printers. A rotatable cylinder 10, one end of which is hollow and transparent, holds the transparency 11 and four photosensitive layers 12, 13, 14 and 15 which, when exposed and developed, become the yellow, magenta, cyan, and black printer negatives respectively. A motor 16 connected to the cylinder 10 through a belt 17 is adapted to rotate the cylinder 10 at a predetremined speed so that it turns on a lead screw 18 to provide longitudinal movement.

A white light source 20 illuminates the transparency 11 through an optical system comprising a lens 21 and a mirror 22 mounted within, and oblique to the axis of the cylinder 10. In order to gain the advantages of alternating current amplification in the subsequent electric circuits, an interrupter or light chopper 23 is placed in the light beam, preferably between the source 20 and the lens 21. For optimum results, the chopper is preferably near the focal plane or the nodal plane of the lens 21. Interruption of the light beam at a frequency of approximately 4000 cycles per second has been found satisfactory. The scanning beam as modified by the transparency 11 then passes through an optical system consisting of an objective 24 and a beam-splitter 25 which produces two separate light beams.

The area of the transparency 11 which is illuminated by lamp 20 is not critical as long as it includes both the sharp and the unsharp spot (these are defined optically by the subsequent imaging system) and as long as light does not escape into the rest of the system to cause spurious effects. Actually for maximum efficiency the spot of illumination is only slightly larger than the unsharp spot. The lens 24 (and beam-splitter 25) form two images of the transparency, one on an opaque plate 27 and the other on an opaque plate 29. These plates are respectively provided with transparent apertures 26 and 28. The aperture 26 corresponds to a sharp spot or elemental scanning area of the transparency and the other aperture aperture 28 is somewhat larger and corresponds to an unsharp spot. In general the two images are highly magnified by the lens 24 so that the apertures are easy to manufacture even though they both correspond to very minute areas at the transparency 11. In practice the sharp spot is selected small enough to give acceptable resolution in the finished picture. A scanning spot 1/100 of an inch in diameter, for example, gives approximately the same resolution and definition as a 100 line screen at unit magnification in photomechanical processes. Incidentally, if the negatives made by the invention are to be used in some half-tone processes, two requirements should preferably be observed. The first is that the scanning should preferably be finer than the screening; if the negatives are to be enlarged, the scanning should be so fine that even after enlargement it is not appreciably greater than the screening. The second is that the unsharpness involved in the present invention will be most effective in overcoming loss of detail due to screening if the unsharp scanning spot is approximately the same fineness as the screening or slightly coarser. Of course, "unsharpness" to improve detail is effective at other degrees of fineness, but the loss of detail due to the screening is, in practice, one of the most important, and therefore in most cases I prefer an unsharp scanning spot that is most effective for overcoming this particular form of loss of detail.

Having selected a desired size of sharp scanning spot (in terms of the process to be used and the other usual factors) this spot size constitutes an "elemental scanning area" (the area of sharp scanning). The present invention, however, introduces unsharp scanning in addition to the sharp scanning thus defined, and this unsharp scanning involves a larger area, usually 1½ to 5 times the diameter of the elemental scanning area. The aperture 28 corresponds in size to the unsharp scanning spot and determines the degree of diffusion or unsharpness in the luminous energy of the unsharp scanning beam. As explained in my above-mentioned U. S. Patent 2,420,636, unsharpness in a photographic print is commonly measured in terms of resolving power or of contribution to confusion and will not be discussed in detail herein. It is sufficient to note that when an unsharp mask is used to accomplish unsharp masking in photographic processes, the extent to which fine detail is enhanced and an outlining effect is obtained is dependent upon the contribution to confusion of the mask. The light-transmitting aperture 28 may be round, square, annular, or of any desired shape. If the aperture 28 is annular and the aperture 26 is punctual, the unsharp scanning is of an annular area surrounding and concentric with a punctual sharp scanning spot.

The sharp and the unsharp scanning beams (transmitted by the apertures 26 and 28 respectively) are collimated by optical systems shown as simple lenses 30 and 31 respectively. The sharp scanning beam as collimated by the lens 30 is split into three separate beams by reflectors 33BS, 33GS, and 33RS, each of which accepts a portion of the beam and reflects it through a primary color filter (34BS, 34GS, and 34RS respectively) into a photoelectric cell (35BS, 35GS, and 35RS respectively). The designations B, G and R refer to the blue, green and red channels respectively and the designations S and U refer to the sharp and unsharp channels. The electric channels and the electric signals therein are hereinafter referred to both in terms of the (primary) color of the filter through which the sharp scanning beam is passed to establish the electric signal and in terms of the corresponding (subtractive) color printer, e. g., "sharp red signal" is used interchangeably with "cyan printer channel signal." The unsharp scanning beam as collimated by the lens 31 is also split into three separate beams by reflectors 33BU, 33GU, and 33RU, each of which accepts a portion of the beam and reflects it through a color filter (34BU, 34GU, and 34RU respectively) into a photoelectric cell (35BU, 35GU, and 35RU respectively).

Alternatively, the separation of a scanning beam into its primary color components may be accomplished by the use of spectrally selective dichroic filters positioned directly in the scanning beam instead of utilizing reflectors to direct a portion of the beam to primary color filters. As is well known the optical efficiency of such dichroic filters is higher than the system employed in the embodiment of Fig. 1.

As taught in the aforementioned Hall patents, masking is mathematically equivalent to the division of quantities raised to exponents whose ratio is the masking factor. The responses of the photoelectric cells 35BS, 35GS, 35RS, 35BU, 35GU, and 35RU are passed through nonlinear amplifiers 36BS, 36GS, 36RS, 36BU, 36GU, and 36RU respectively, whose nonlinearity is in the form of exponential functions in order to provide means for producing masking type modification of a sharp scanning signal by an unsharp scanning signal in the form of the division of transmissions at different gammas.

Modification of signals proportional to color transmissions raised to exponents whose ratio is the masking factor is analogous to the well known masking type color correction, and the various methods for producing this analogy are well known and do not constitute a peculiar feature of the present invention. However, the fact that the range of masking factors utilized to produce color correction is also adequate to obtain the advantages of unsharp masking is quite pertinent. For example, masking of a green negative of gamma 1, by a positive red separation developed to a gamma of .45 is desirable for color correction in many reproduction systems. The use of an unsharp mask with this masking factor (.45) is also satisfactory to improve sharpness of detail in a reproduction.

In Fig. 1 the signal from the photoelectric cell 35RS is modified in accordance with the signal from the photoelectric cell 35RU in the mixer 38R, and the modified signal is subsequently utilized to control the exposure of the photographic film 14. Inverter rectifiers 37RU, GU and BU, which rectify the input signals and deliver the outputs of the rectifiers in such a direction that the rectified signals become more negative as the amplitudes of the input signals increase (as shown in detail in Fig. 3), are used as a convenient means of providing division in the mixers 38R etc.; that is, the greater the output of the photocells 35RU etc., the more negative is the potential applied to bias one of the control grids in mixer 38R or 38G.

Exponential amplifiers 36BS, 36GS, 36RS, 36BU, 36GU, and 36RU thus facilitate control of masking factor. It is unnecessary to utilize exponential amplifiers in both the sharp and the unsharp electric channels to control the masking factor. The desired masking factor may be obtained if a nonlinear amplifier having the proper exponential function is utilized in only the sharp or only the unsharp electric channel and the signal in the other channel is not amplified or is amplified linearly. It is necessary however to have the inverter rectifiers 37RU etc. or else to use mixers with negative response to one control grid and positive to the other. For example the signal from 36RS must be reduced (not enhanced) by the signal from 36RU, and the inverter rectifier 37RU permits selection of the direction in which the latter signal acts. In Fig. 1, exponential amplifiers are used in both channels to allow greater latitude in selection of the masking factor.

It should be noted that in practice an amplifier may not be strictly exponential throughout its range and the modulation may not be strictly division. In fact some departure from the mathematically exact system is in many cases an advantage giving better color reproduction and particularly giving better tone reproduction.

In this highly preferred embodiment of the invention the outputs of the exponential amplifiers in the sharp red and the sharp green channel (36BS and 36GS respectively) are modulated in accordance with the output of the unsharp red channel exponential amplifier 36RU in the mixers 38R and 38G respectively, and the output of the exponential amplifier 36BS in the sharp blue channel is modified in accordance with the output of the unsharp green channel exponential amplifier 36GU in the mixer 38B. The ratio of the transmission functions of the exponential amplifiers is such that desired color correction is obtained, e. g., the transmission functions of the exponential amplifiers 36GS and 36RU are selected so that their ratio is approximately .45. Detail in the yellow, magenta, and cyan printer negatives, which are subsequently exposed under the control of the mixers 38B, 38G, and 38R respectively, is considerably enhanced in comparison to the transparency 11. Thus unsharp masking is obtained in each of the color printer channels with only a minimum modification of the equipment required for color correction.

The mixers 38B, 38G, and 38R include converter or mixer tubes which have two control grids capable of acting independently on the electron stream. The output of the exponential amplifier in each sharp channel is fed to one control grid, and the output of the exponential amplifier in the unsharp channel is rectified and reversed in direction in an inverter rectifier and separately fed to a second control grid; the modification is approximately in the form of multiplication with one signal inverted which thus constitutes division. That is, the output of an exponential amplifier in an unsharp channel is rectified and fed to a control grid of a mixer tube in such a direction that the bias on the control grid becomes more negative as the amplitude of the unsharp signal increases, and thus the modification is in the form of division of quantities linearly proportional to exposures raised to exponents (equal to the required gammas).

The maximum one of the outputs of the mixers 38B, 38G, and 38R is selected by a black selector 39 to control the exposure of the black printer record 15. An electric circuit for choosing the maximum of three electric signals is described in the Hall and Morse U. S. Patent 2,231,668 and does not constitute a peculiar feature of this invention. Also in my U. S. Patent 2,183,524, I describe methods of controlling a scanning beam in accordance with the intensity of the maximum of three electric signals which are proportional to each primary color content of the original. Any method of selecting the maximum of three color signals to constitute the black signal is satisfactory. The output of the black selector 39 as amplified by the amplifier 41X is demodulated by rectifier 42X and is then utilized to control a light valve 43X in accordance with the maximum of the outputs of the mixers 38B, 38G, and 38R. The light valve 43X controls the light from lamp 44X and hence the exposure of the photosensitive layer 15 mounted on the cylinder 10 which layer, when exposed and developed, becomes the black printer negative. The printing density at each point on the black printer made from the black printer negative is proportional to the least predominant subtractive color content of the corresponding point on the original after color correction has been applied. Furthermore, the sharpness of detail in the black printer negative 15 is improved relative to the transparency 11. One interesting point is that the black detail is improved without ever establishing an unsharp black channel or an unsharp black signal.

Alternatively, the output of the rectifier 42X may directly energize a glow lamp or other device for exposing the photosensitive layer 15 in a manner similar to that illustrated in Fig. 5. It is to be understood in each and every one of the systems described herein that a ribbon type light valve and a light source are equivalent to a glow lamp, and either may be substituted for the other in a well known manner (e. g., as discussed by Hall and Streiffert 2,313,542).

In a four-color process the yellow, magenta, and cyan printers are preferably reduced in density by the amount assigned to the black printer. This is accomplished by rectifying part of the output of black selector 39 in an inverter rectifier 45 which feeds the output thereof inverted, i. e., in such a direction that the output signal becomes more negative as the input signal increases in amplitude, to bias the control grade of the mixers 40B, 40G and 40R which modify the respective color channels. The outputs of these mixers 40B, 40G and 40R as amplified by the amplifiers 41B, 41G and 41R are demodulated by rectifiers 42B, 42G and 42R and then operate light valves 43B, 43G and 43R respectively which control the intensity of scanning beams from the light sources 44B, 44G and 44R for exposing the photosensitive layers 12, 13, and 14 respectively. After exposure the photosensitive layers 12, 13, 14, and 15 are removed from the drum 10 and processed in the usual way to give the desired yellow, magenta, cyan, and black printer negatives respectively. The detail in each printer negative is enhanced relative to the transparency 11.

In practice, elements 33BU, 34BU, 35BU, 36BU and 37BU are of course omitted since they are not used in the particular color correction just described. Similarly this system employs only two of three output connections on 37RU and only one on 37GU. However, these elements are included for generality and to allow the type of color correction to be changed. Theoretically each color signal should be corrected by both of the other colors, but the amount of correction is so small as to be unnecessary in some cases. For example, yellow printing inks are usually so good that the theoretical correction of "red" by "blue" or "green" by "blue" is negligible. Fig. 1 shows blue by green, and green by red (plus red by red for unsharpness effect only). Some processes require blue by both green and red; these usually correct green by red and red by green. The present invention is applicable to all types of such color correction and even to black and white processes.

The preferred embodiment of the invention shown in Fig. 1 illustrates one method and means for producing sharp and unsharp scanning of a multicolored original. To emphasize the novel features of the invention, the description of alternative methods and apparatus for accomplishing substantially simultaneous sharp and unsharp scanning as required in the preferred embodiments of the invention will be confined to the employment of the invention in the reproduction of a black-and-white transparency, but it is to be understood that the sharp and the unsharp scanning beams may each be divided into a plurality of spectral components if it is desired to utilize any of the forms of the invention hereinafter described in the reproduction of a colored original. Furthermore, it is apparent that a transparency, or a reflecting print, may be scanned by reflected light if necessary. Embodiments alternative to Fig. 1 for simultaneously accomplishing color correction and unsharp masking in color reproduction processes will be discussed later in the specification.

Fig. 2 shows a form of the invention which includes the essential features of the embodiment of Fig. 1, but which is not restricted to color reproduction. A rotatable transparent scanning drum 80 adapted to carry a transparency 81 and a photosensitive layer 82 is driven at a predetermined speed by a motor 83 through a belt 84. The drum 80 is also provided with a lead screw 85 to provide longitudinal movement thereof. A mirror 86 is mounted within the drum 80 oblique to the axis thereof. Light from a lamp 87 passing through a light transmitting aperture 88 in an opaque diaphragm 89 is reflected by the mirror 86 against the inner periphery of the drum 80. A light chopper 91 placed in the optical path between the diaphragm 89 and the mirror 86 interrupts the light at a high audio frequency to allow A. C. amplification of electric signals established from the luminous energies. An objective 90 images the light transmitting aperture 88 on the transparency 81, covering the area of an unsharp spot thereon. The sharp spot (within the unsharp one) is defined by the subsequent optics but the unsharp spot is defined by the illuminating system. The illuminated unsharp spot is then focused by an objective 92 upon a light-transmiting aperture 93 in a mirror 94 which is oblique to the optic axis of the optical system 92. The size of the aperture 93 depends on the magnification by the lens 92 but in any case, it corresponds to an elemental scanning area on the film 81 and it transmits only the central portion of the image formed thereon (i. e., the sharp scanning beam) into a photoelectric cell 98. The mirror 94 reflects the light not transmitted by the aperture 93, i. e., reflects the unsharp scanning beam, to a photoelectric cell 99. The outputs of the photoelectric cells 98 and 99 are first passed through linear amplifiers 101 and 102 and then through nonlinear amplifiers 103 and 104 respectively, whose nonlinearity is in the form of exponential functions, and as in Fig. 1, division of the signal from 98 by the signal from 99 raised to the power gamma (provided by amplifier 104) is provided through an amplifier 108 and an inverter rectifier 105 feeding into amplifier 101.

This modified response from 101 is successively amplified nonlinearly by an amplifier 103 and linearly by an amplifier 109. The output of the amplifier 109 is fed to a rectifier 111 which operates as a demodulator to make available a signal which is the electrical equivalent of the luminous energy of a scanning beam transmitted through the combination of the transparency 81 and an unsharp mask made therefrom. The rectified signal operates a glow lamp 112 for exposing the photosensitive layer 82 mounted on the transparent drum 80. Definition in the film 82, after removal from the drum 80 and processing in the usual manner is surprisingly better than that obtained by ordinary duplicating methods in which no masking is employed.

In Fig. 3 a detailed electric circuit corresponding to Fig. 2 is shown. Attention is drawn to the similarity of this circuit to Fig. 2 of the Hall Patent 2,286,730. The details of the linear amplifiers 101 and 102 and nonlinear amplifiers 103 and 104 are shown. Nonlinear amplifiers are well known and are described in the aforementioned Hall patents. The term amplifier is used (as is not uncommon) to cover even units in which the amplification factor is less than unity; this form of amplifier is sometimes called a compressor. The second stage of linear amplification in the unsharp electric channel consists of two triodes 114 which feed a transformer 115 coupled to a diode rectifier 116. The rectified signal is passed through a filter 123 and then fed to the second control grid of two variable-mu mixer tubes 117 operated in push pull. Each of the mixer tubes 117 has two control grids capable of acting independently on the electron stream. The amplified response of the photoelectric cell 98 in the sharp electric channel is fed to the primary winding of a coupling transformer 124, the secondary of which is connected to the first control grid of the mixer tubes 117 as taught in the aforementioned patents of Hall and Murray et al. The rectified voltage output of the diode 116 alters the gain of the two mixer tubes 117 but since the tubes are in push pull, this voltage does not appear directly in the output thereof. By the usual choice of bias voltage the output of the mixer tubes 117 is made to vary linearly with change in the output of the rectifier 116. The response of the photoelectric cell 98 is thus modified in accordance with the rectified output of the diode 116. This modified signal is fed through a nonlinear amplifier 103 and a second stage of linear amplification consisting of two triodes 118 which feed the full-wave bridge rectifier 111. The rectified signal operates a glow lamp 112 for exposing the photosensitive layer 82 in synchronism with the scanning of the transparency 81. As explained above, if the transmission functions of the nonlinear amplifiers 103 and 104 are exponential, the modification of the signal corresponding to sharp scanning by the signal corresponding to unsharp scanning represents the division of quantities at different gammas.

To emphasize the novel features of the invention and to aid in the understanding of the invention, the sharp and the unsharp electric channels will be hereinafter shown in block form in the figures. In the embodiments hereinafter described, it is to be understood that the signals transmitted in the sharp and in the unsharp electric channels are amplified both linearly and nonlinearly as shown in Figs. 2 and 3.

Fig. 4 shows only that portion of an electro-optical reproduction system which accomplishes modulation of sharp scanning intelligence in accordance with unsharp scanning intelligence. Optical modulation using two light valves (in Fig. 4 one of them is a glow lamp) in optical tandem, i. e., two valves operating on the same light beam, is utilized to obtain the desired modification. The outputs of the sharp and the unsharp electric channels independently control respectively a glow lamp 130 and a ribbon type light valve 131 (shown conventionally without the magnet) arranged in optical tandem. The light from a glow lamp 130 is focused by an optical system 132 on the aperture in the light valve 131 and then refocused by an optical system 133 on a sensitive film 134 mounted on a drum 147 for scanning in the usual manner in synchronism with the scanning of the image record to be reproduced. Alternatively, the output from the unsharp channel may be fed to a glow lamp and the output from the sharp channel fed into a ribbon type valve so that the glow lamp and the light valve are interchanged relative to the position shown in Fig. 4.

Similarly in Fig. 5 two ribbon type light valves arranged in optical tandem at right angles to each other are utilized to obtain modification of the signal corresponding to the sharp scanning intelligence in accordance with the signal corresponding to the unsharp scanning intelligence. A light source 140 and an optical system 141 focus a spot of light on the aperture of a ribbon type light valve 142 which is connected to the output of the sharp channel. The light from this valve 142 is refocused by a lens 143 on the aperture of another ribbon type light valve 144 connected to the output of the unsharp channel, and the light from the valve 144 is focused by a lens 145 on a sensitive film 146 mounted for scanning on the cylinder or drum 147. Either of these optical systems is equivalent to the electrical division of signals described relative to Figs. 2 and 3.

The systems shown in Figs. 6 to 16 produce the sharp and unsharp signals and the former is then modified by the latter by any one of the systems shown in Figs. 1 to 5.

Figure 6:
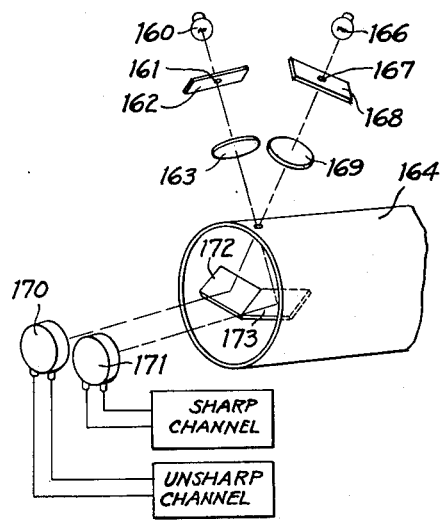

Fig. 6 illustrates another system whereby simultaneous sharp and unsharp scanning of an original are accomplished. An elemental scanning spot and a slightly larger scanning spot are independently illuminated on the original with the axis of the illuminating beams oblique and crossing each other at such an angle that the unsharp scanning spot includes the elemental sharp scanning spot on the original, and the light from the beams as modified by the original is directed to separate photoelectric cells. Light from a lamp 160 passes through a light-transmitting small aperture 161 in an opaque diaphragm 162. The aperture 161 is imaged by an optical system 163 on a transparency 164 which is mounted on a rotatable transparent cylinder (not shown). The light from a second lamp 166 passing through a larger aperture 167 in a second opaque diaphragm 168 is focused by an optical system 169 upon the transparency 164 so that the image of the aperture 167, i. e., the unsharp scanning spot, includes the image of the smaller aperture 161, i. e., the sharp scanning spot, on the transparency 164. The smaller aperture 161 corresponds in size to an elemental scanning area and the larger aperture 167 corresponds to the unsharp scanning spot. Mirrors 172 and 173 positioned within the rotatable drum (not shown) upon which the transparency 164 is mounted reflect the light from the sharp scanning beam and from the unsharp scanning beam to photoelectric cells 170 and 171 respectively. The responses of the two photoelectric cells 170 and 171 are the required sharp and unsharp signals which are amplified in separate electric channels and then one is modified by the other in any of the ways shown in Figs. 1 to 5.

Figure 7:
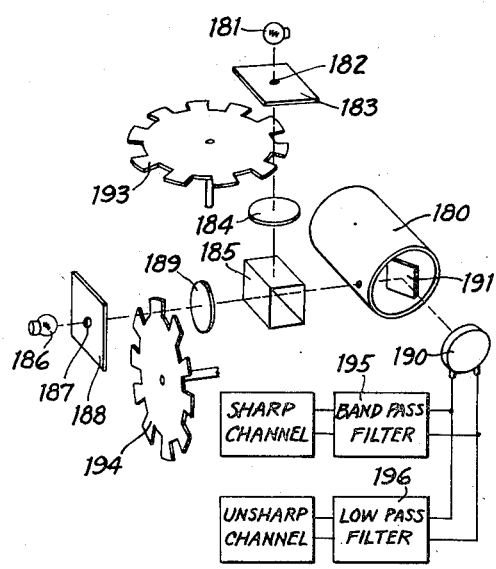
Figure 16:
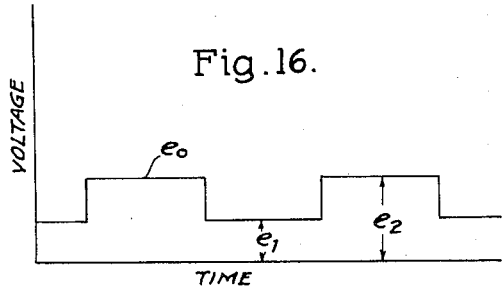

In Fig. 7 the sharp and the unsharp scanning of a transparency 180 are simultaneously accomplished by chopping sharp and unsharp illuminating beams at different frequencies and separating the intelligence corresponding to the sharp scanning from the intelligence corresponding to the unsharp scanning by the use of electric filters. Light from a source 181 passing through a small light transmitting aperture 182 in an opaque diaphragm 183 is focused by an optical system comprising a lens 184 and a beam-combiner 185 to illuminate only an elemental scanning spot upon the transparency 180. Light from a second lamp 186 passing through a somewhat larger aperture 187 in an opaque diaphragm 188 is brought into alignment with the light beam from the aperture 182 and focused into a slightly larger (unsharp) scanning spot on the transparency 180 by an optical system comprising a lens 189 and the beam-combiner 185. The light from the sharp and from the unsharp scanning spots as modified by the transparency 180 is reflected to a single photoelectric cell 190 by a mirror 191 disposed within the scanning drum (not shown) upon which the transparency 180 is mounted. The sharp scanning beam is interrupted by a suitable light chopper 193 (shown as a rotating sector wheel) at a relatively high audio frequency, while the unsharp scanning beam is interrupted by a light chopper 194 at a relatively low audio frequency. Similarly the lamps 181 and 186 may be vapor discharge or glow lamps fed with different audio or radio frequencies to provide the interruption of the scanning beam intensities, and the light choppers 193 and 194 may then be omitted. Interruption of the sharp scanning beam at approximately 5,000 cycles per second and of the unsharp scanning beam at approximately 2,000 cycles per second is satisfactory. The response of the photoelectric cell 191 is fed both to an electric channel having a band pass filter 195 therein and to a second electric channel having a low pass filter 196 therein (thus corresponding to the unsharp scanning intelligence). The band pass filter 195 freely transmits frequencies greater and less than the carrier frequency by the sideband frequency. Since sidebands of 1,000 cycles are adequate to transmit the finest detail it is desired to reproduce, the band pass filter freely transmits all frequencies between 4,000 and 6,000 cycles and greatly attenuates other frequencies, while the low pass filter 196 cuts off at approximately 3,000 cycles. Thus it is possible to discriminate between the signals corresponding to the sharp scanning intelligence and the unsharp scanning intelligence by the use of electric filters. The output of the low pass filter 196 is fed to the unsharp scanning channel and is utilized to modify the output of the band pass filter 195 in the sharp scanning channel by any of the methods hereinbefore described. The degree of unsharpness, i. e., lack of detail, in the unsharp scanning intelligence is determined by the size of the aperture 187.

Figure 8:
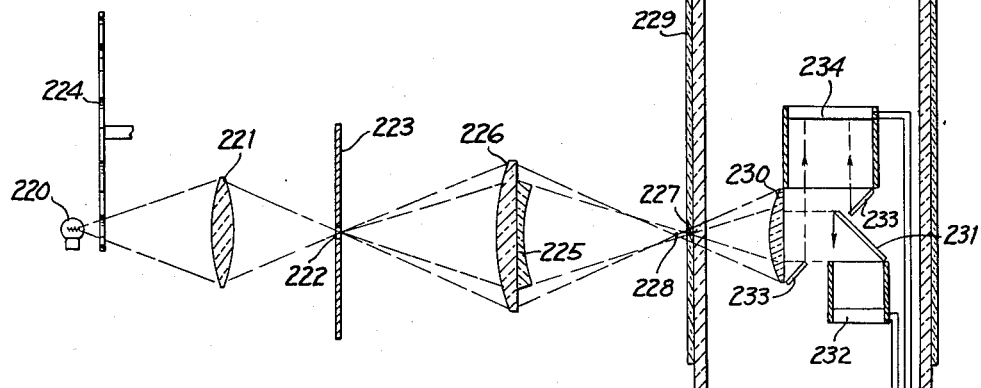

Fig. 8 is similar to Fig. 5 in that the sharp scanning beam and the unsharp scanning beam are focused on the transparency from different directions. However, whereas in Fig. 5 the axes of the two beams are oblique, Fig. 8 has the axes of the central sharp scanning beam and the annular unsharp scanning beam coincident. Light from a source 220 through a rotating sector wheel 224 and a lens 221 illuminates a light-transmitting aperture 222 in an opaque diaphragm 223. A two zone doublet consisting of a paraxial plano-concave element 225 cemented to a larger diameter, wide aperture, plano-convex element 226 focuses two images 227 and 228 on the transparency 229. The image 227 is focused sharply on the transparency 229 to define a central sharp scanning beam, i. e., the sharp elemental scanning spot; the image 228 is out of focus relative to the transparency 229 and thus forms an annular unsharp scanning beam surrounding the sharp elemental scanning spot on the transparency 229. The light from the two beams as modified by the transparency 229 is collimated by a lens 230 positioned within the rotatable transparent drum 235 upon which the transparency 229 is mounted. The portion of the collimated beam from the paraxial zone 225 of the doublet is reflected by a circular mirror 231 positioned centrally in and oblique to the axis of the collimated beam into a first photoelectric cell 232. The portion of the collimated beam from the marginal zone 226 of the doublet is directed by a large annular mirror 233 into a separate photoelectric cell 234. The responses of the photoelectric cells 232 and 234 are fed to the sharp and the unsharp electric channels respectively, and the sharp channel signal is modulated in accordance with the unsharp channel signal by any of the methods hereinbefore described to produce the effect of unsharp masking of the transparency 229.

Figure 9:
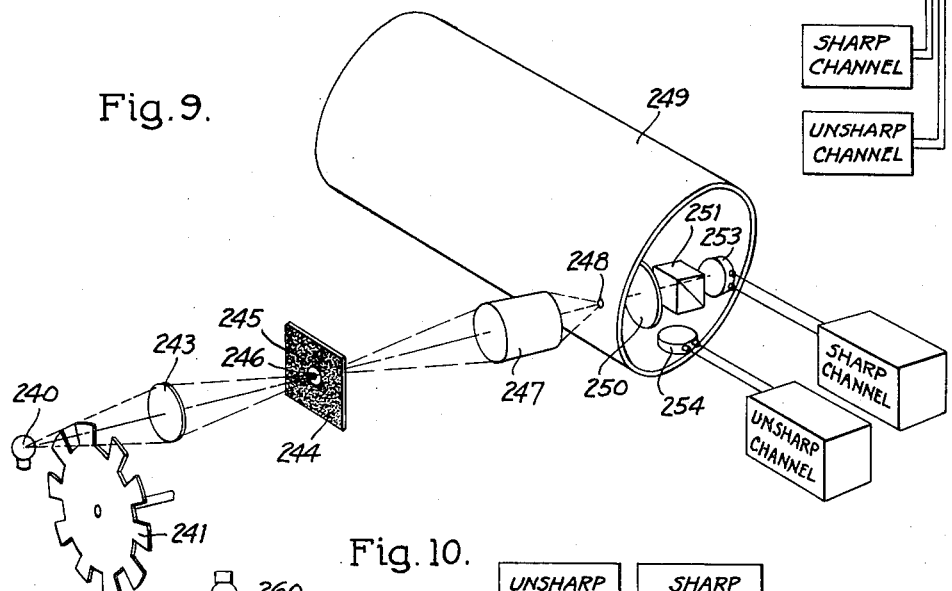

Fig. 9 illustrates an electro-optical system which employs polarized light to effect simultaneous sharp and unsharp scanning of a transparency. Light from a lamp 240 passing through a light chopper 241 and a lens 243 illuminates an opaque plate 244 including a small central spot 246 and an annular area 245 both of which are light transmitting and are covered by plane polarizing filters with their vibration axes at right angles, respectively corresponding to the sharp and unsharp spots when focused by lens 247 at point 248 of a transparency 249. A lens 250 mounted within the drum collimates the coaxial beams and directs them to the entrance face of a polarizing beam-splitter 251 which may be of any suitable type such as shown in U. S. Patent 2,403,731, MacNeille. The polarizing beam-splitter 251 transmits the light from the polarizing screen 246, as modified by the transparency 249, into a photoelectric cell 253, and reflects the light from the polarizing screen 245, as modified by the transparency 249, into a separate photoelectric cell 254. The responses of the photoelectric cells 253 and 254 are fed into the sharp and the unsharp electric channels respectively, and the signal in the sharp channel is modified in accordance with the signal in the unsharp channel. The degree of unsharpness is determined by the size of the annulus 245. It is apparent that the small polarizing screen 246 which defines the central sharp scanning beam, may be square, rectangular, or of any desired shape.

The above system gives ring type unsharpness. If the center spot 246 is not covered by any polarizing filter, the photocell 254 receives light from a whole disc instead of a ring or annulus and the photo cell 253 still receives only the central spot light polarized by the beam splitter 251. This gives disc type unsharp masking.

Figure 10:
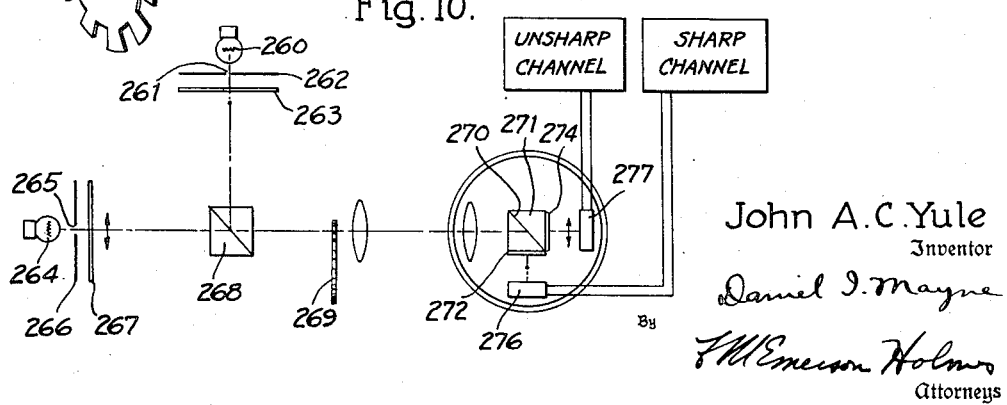

Fig. 10 illustrates an electro-optical system which, in a manner similar to Fig. 9, utilizes polarized light beams to effect simultaneous sharp and unsharp scanning of a transparency. The light from a lamp 260 passing through a small light-transmitting aperture 261 (corresponding to the sharp spot) in an opaque diaphragm 262 is polarized by filter 263 with the electric vector perpendicular to the plane of the drawing (depicted by a (·) in the drawing). The light from a second lamp 264 passing through a slightly larger aperture 265 in a second opaque diaphragm 266 is polarized by filter 267 with the electric vector parallel to the plane of the drawing (depicted by a double-pointed arrow (↕) in the drawing). The sharp scanning beam defined by the aperture 261 is brought into alignment by a beam-combiner 268 with the unsharp scanning beam defined by the aperture 265. A rotating sector wheel 269 interrupts the aligned light beams at a high audio frequency; this is located near the lens but may be elsewhere in the light beam. The area of the aperture 261 corresponds to the area of an element sharp scanning spot, while the area of the aperture 265 determines the degree of unsharpness. More of the light polarized with the electric vector perpendicular to the plane of the drawing is reflected than is transmitted, and more of the light polarized with the electric vector parallel to the plane of the drawing is transmitted than is reflected, by the inclined surface 270 of a beam-splitter 271. A polarizing filter 272 receives and transmits the reflected beam with the electric vector perpendicular to the plane of the drawing and absorbs light polarized with the electric vector parallel to the plane of the drawing. Similarly, a polarizing filter 274 receives and transmits light polarized with the electric vector parallel to the plane of the drawing and absorbs light polarized with the electric vector perpendicular to the plane of the drawing. The response of a photoelectric cell 276 placed opposite the filter 272 is fed into the sharp electric channel, and the response of a second photoelectric cell 277 placed opposite the filter 274 is fed into the unsharp electric channel. It may be noted that the definition of the sharp and unsharp spots is provided optically ahead of the transparency and the illumination is from the outside so that this definition is not affected by the glass drum or anything else inside the transparency cylinder.

Figure 11:
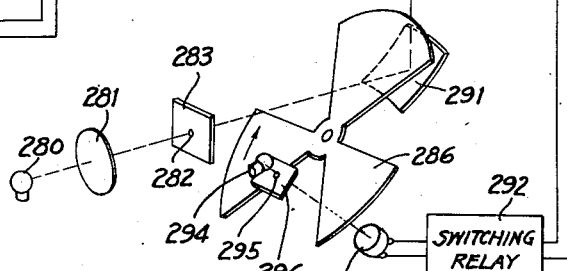

Fig. 11 illustrates an electro-optical system for accomplishing sharp and unsharp scanning alternately but at a high frequency. Elemental spots and relatively larger spots are alternately projected upon a transparency, and the electric signals established by the luminous energy of the elemental spots and the relatively larger scanning spots as modified by the transparency are switched into separate electric channels in synchronism with the projection of the two spots. Change in scanning spot size is accomplished by periodically varying the sharpness of focus of the scanning beam. Light from a lamp 280 through a condenser lens 281 illuminates a small light-transmitting aperture 282 in an opaque diaphragm 283. Light from the aperture 282 is reflected either by sectors of a rotatable circular mirror 286 (which may be of glass with alternate silvered sectors and transparent sectors) or by a mirror 291 which is plane or spherical depending on how much out of focus the unsharp spot is to be. The rotatable mirror 286 is oblique to the axis of the light beam. When this light beam falls upon a sector of the mirror 286, the reflected light is focused by a lens 287 sharply upon a transparency 288 to produce an elemental sharp scanning spot. The scanning light as modified by the transparency 288 is received by a photoelectric cell 289 mounted within the rotatable scanning drum (not shown) upon which the transparency 288 is mounted. The mirror 286 is rotated by a motor (not shown), and when a transparent sector thereof is rotated to a position in front of the light beam from the aperture 282 the spherical or plane mirror 291 mounted behind the rotatable mirror reflects this light beam toward the transparency 288. The lens 287 focuses the light reflected by the mirror 291 into a relatively large unsharp scanning spot on the transparency 288. A switching relay 292 (shown in block form) alternately switches the response of the photoelectric cell 289 into the sharp and the unsharp electric channel in synchronism with the alternate sharp and unsharp focusing of the scanning spot. Light from a lamp 294 through an aperture 295 in a mask 296 falls upon a photoelectric cell 297 positioned behind the rotating mirror 286 whenever a transparent sector thereof is disposed between the cell 297 and the lamp 294. The photoelectric cell 297 is displaced along an arc about the center of rotation of the mirror 286 an integral multiple of the sector angle from the mirror 291, and the response of this cell 297 provides the synchronizing impulses to operate the switching relay 292 in synchronism with the alternate sharp and unsharp focusing of the scanning spot. The position of the cell 297 relative to the sector wheel 286 may be adjusted to take care of any time delay in the operation of the switching relay.

Figure 12:
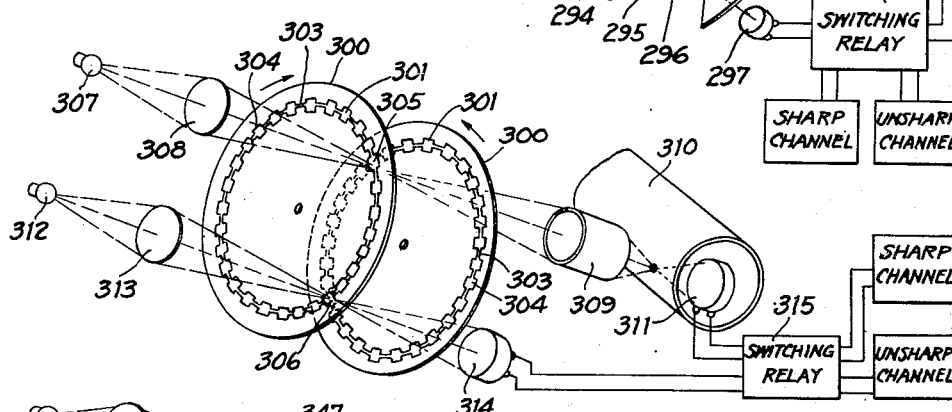

Fig. 12 is similar to Fig. 11 except that an alternative method is shown of alternately projecting elemental and realtively larger scanning spots in rapid succession upon a transparency. Two identical opaque disks 300 are constructed with an annular transparent region 301 near the outer circumference thereof. The annular transparent region 301 has crenelated edges and alternately narrows and widens at equal angular displacements around the disk 300 to produce alternate narrow rectangular transparent areas 303 and wide rectangular transparent areas 304 around the annular region 301. The two disks 300 are mounted adjacent to each other with only a portion of the disks overlapping so that the annular transparent regions 301 cross approximately at right angles. As the disks 300 are synchronously rotated by a motor (not shown) the wide rectangular areas of the rings 301 in the adjacent disks come into register at the points 305 and 306 and then the narrow rectangular areas come into register at these points to produce large and small, approximately square, light-transmitting apertures alternately. A light source 307 through a condenser lens 308 illuminates the point 305 and the square aperture at this point 305 is imaged by a lens 309 upon a transparency 310. A photoelectric cell 311, mounted within a rotatable transparent scanning drum (not shown) upon which the transparency 310 is mounted, receives the light modified by the transparency 310. The width of the transparent areas at the point 305 determines the size of the approximately square, scanning spot on the transparency 310 and this spot is alternately sharp and unsharp. Light from a second lamp 312 is focused on the point 306 by a lens 313 and passes through the transparent rings 301 to illuminate a photoelectric cell 314 positioned on the opposite side. The response of this photoelectric cell 314 provides the synchronizing impulses for operating a switching relay 315 which alternately switches the response of the photoelectric cell 311 into the sharp and the unsharp electric channels in synchronism with the alternate projection of the sharp scanning spot and the unsharp scanning spot on the transparency 310.

The transparent annular region 301 of the disks 300 can be varied in contour as desired to control the shape of the scanning spot. For example, if the transparent region 301 is constructed of alternate large and small transparent circular apertures, a circular scanning spot of periodically varying size is obtained.

Figure 13:
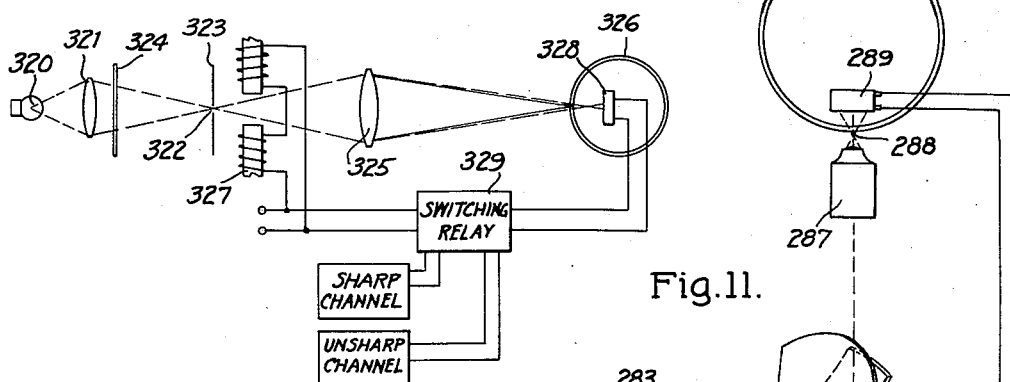

Fig. 13 is also similar to Figs. 11 and 12 in that the scanning beam is alternately thrown into and out of focus to effect sharp and unsharp focusing, respectively, of a transparency. In this case however a double refracting lens is used to form both sharp and unsharp spots of light on a transparency and these are selected alternately by proper polarization of the incident light. A light source 320 through a condenser lens 321 illuminates a light-transmitting aperture 322 in an opaque diaphragm 323. An objective 325 including a double-refracting element forms two images of the aperture 322, one of them sharply in focus upon the transparency 326. The lens element 325 is ground with the optic axis in such a direction that the difference in the two indices of refraction is a maximum. A polarizing screen 324 positioned in the light beam is oriented so that normally only the ray which forms the sharp image on the transparency gets through and the lens 325 is focused so that this is the ordinary ray. The reason for this is that the extraordinary ray has different indices of refraction depending on the direction it passes through the lens and hence the ordinary ray image has less aberrations and therefore it is the preferable one for the sharp image. If the plane of polarization of the incident polarized light is rotated even a small amount, some of the extraordinary ray starts to come through giving an unsharp spot. An electromagnet 327 disposed adjacent the diaphragm 323 with the North and South magnetic poles thereof positioned on opposite sides of the light beam is energized with a periodically interrupted magnetizing current which causes the magnetic field of the electromagnet 327 to alternately build up and decay. Energization of the electromagnet 327 causes rotation of the plane of polarization of the light beam passing through the polarizing screen 324. This is known as the Kerr effect. Rotation of the plane of polarization of the light emanating from the aperture 322 through a full 90° would provide a maximum, extraordinary, unsharp spot but even less rotation still provides unsharpness. A photoelectric cell 328, mounted within the rotatable scanning drum (not shown) on which the transparency 326 is mounted, receives the light as modified by the transparency 326. The response of the photoelectric cell 328 is alternately switched into the sharp and the unsharp electric channel by a switching relay 329 in synchronism with the interruption of the magnetizing current fed to the electromagnet 327.

Figure 14:
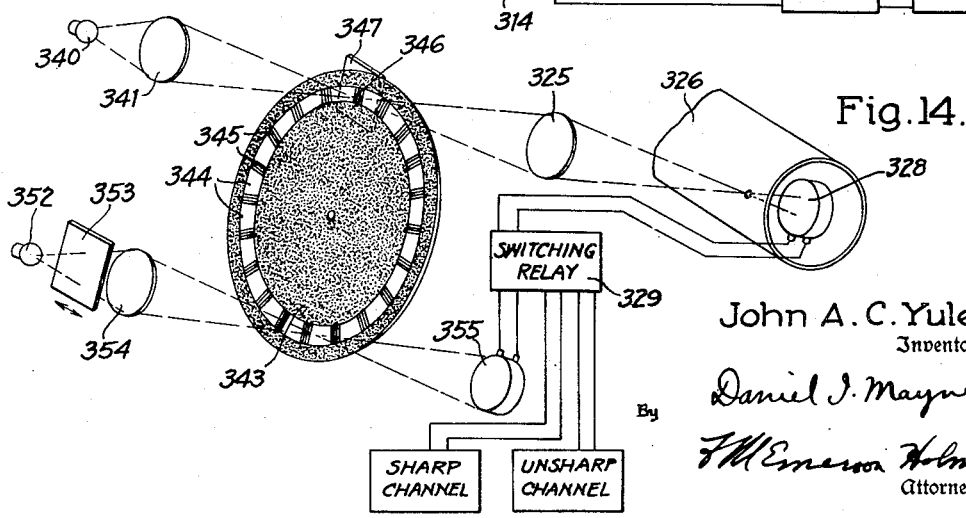

Alternative apparatus for providing the changing polarization is illustrated in Fig. 14 which is otherwise similar to that of Fig. 13. Light from a lamp 340 is directed by a lens 341 upon an annular transparent zone in a rotatable opaque disk 343. The annular transparent zone is made up of alternate small, approximately rectangular, transparent areas 344 and small, approximately rectangular, polarizing screens 345 positioned at equal angular displacements around the disk. The light transmitted is bifocused by the lens 325 as before. The disk 343 is driven by a motor (not shown), and the polarizing screens 345 are oriented so that the intensity of the ordinary ray refracted by the lens 325 is a maximum and the intensity of the extraordinary ray is practically zero when each polarizing screen 345 is opposite the pinhole aperture 346. When the disk 343 is rotated to bring a transparent area 344 opposite the pinhole aperture 346, the intensities of both the ordinary ray and of the extraordinary ray are high and approximately equal. The extraordinary ray is brought to a sharp focus in front of or behind the transparency 326 depending upon whether the crystal from which the lens 325 was ground was positive or negative, and it thus forms an unsharp spot. Thus the scanning beam is focused unsharply whenever a transparent area 344 is opposite the pinhole aperture 346 and sharply whenever the filters 345 are so aligned. Light from a second lamp 352 passing through a polarizing screen 353 is focused by a lens 354 upon the annular transparent zone at a point displaced from the position where light from the lamp 340 is focused. The screen 353 and the polarizing screens 345 are crossed relative to this second light beam which illuminates a photoelectric cell 355 whose response provides the synchronizing impulses to control the switching relay 329 which alternately switches the response of the photoelectric cell 328 into the sharp and the unsharp electric channel in synchronism with the sharp and unsharp scanning.

Fig. 15 illustrates another method and apparatus to provide a square wave alternating sharp and unsharp scanning. It utilizes voltage input such as illustrated by the graph in Fig. 16 to operate two light valves in optical tandem. Light from a lamp 60 passing through a condenser lens 63 illuminates the aperture of a ribbon type light valve 64. The light from the valve 64 is refocused by an optical system 65 on the aperture in a second ribbon type light valve 66. The light from the valve 66 is refocused by an optical system 67 to a small spot on a transparency 68 which is mounted on a rotatable scanning drum (not shown). The light as modified by the transparency 68 is then reflected by a mirror 69, mounted within and oblique to the axis of the drum, into a photoelectric cell 70. A square wave voltage $e_0$ (shown in Fig. 16) is utilized to operate the light valves 64 and 66 and the switching relay 71. Since the valves 64 and 66 are at right angles to each other and are operated by the same square wave voltage $e_0$, the scanning spot produced on the transparency 68 is a square of varying size. An elemental scanning spot is projected upon the transparency 68 when the minimum voltage $e_1$ determines the separation of the ribbons of the light valves 64 and 66; a slightly larger, i. e., unsharp, scanning spot is projected when the maximum voltage $e_2$ is applied to separate the ribbons. The square wave voltage $e_0$ is also utilized to control the switching relay 71 which alternately switches the response of the photoelectric cell 70 into the sharp electric channel 72 and the unsharp electric channel 73.

In connection with Figs. 2 to 16 the description has been confined to unsharp masking applied to black-and-white or to the correction of one single color signal by the same color or another color signal.

The following description relative to Figs. 17 to 23 has to do with various methods of providing both color correction masking and unsharp masking.

Color correction in three-color or four-color electrooptical processes involves the reduction of one color signal by another. In general, the blue signal is reduced in proportion to the green, and perhaps also in proportion to the red. Also the green signal is reduced in proportion to the red. It is also sometimes important to reduce the red signal in proportion to the green. The reduction of red and usually of green in proportion to blue is usually quite unnecessary because of the high purity of available yellow printing inks or other coloring material whose density is ultimately controlled by the blue signal.

In four-color processes a black signal is provided in any one of a number of ways. To correspond to a yellow filter negative or an infrared filter negative of the types sometimes used in photographic color processes, yellow filter signals or infrared filter signals can be established. I prefer however, to use black printers whose printing density at each point is equal to the least predominant subtractive color content of the color of the corresponding point of the original. This is sometimes called an ideal black printer, and printers whose density is a constant fraction (or approximately constant fraction) of this "ideal" density are useful. In electro-optical systems, this means that the black printer signal should be proportional to the largest of the three primary color signals. In this connection reference is made to my patents U. S. 2,183,524 and U. S. 2,183,525 and to the Hall and Morse Patent U. S. 2,231,668.

The first factor which contributes to the success of the combination of color correction and unsharp masking is the fact that both require the masking of a negative by a positive or viceversa rather than the use of two negatives or positives. If this were not so, it would not be possible to accomplish both phenomena simultaneously.

A second factor which is favorable to this combination is the fact that the "masking factors" required for color correction are within the range which are useful for detail correction (enhancement) by unsharp masking. If color correction required only a very small masking factor, say 5%, this masking would be of very little value indeed in unsharp work.

A third factor which is similarly pertinent is that the best form of unsharp masking usually employs a constant masking factor throughout the whole range of tones from the highlights to the shadows. In electro-optical color correction this constant masking factor is obtained by the use of devices such as exponential amplifiers and these devices automatically provide the preferred form of unsharp masking. It should be noted however, that unsharp masking is, in this respect, not as critical as the color correction and useful unsharp effects are obtained even without constant masking factors or exponential amplifiers.

A fourth very pertinent part of this combination arises in connection with four-color processes. One may of course provide unsharp color signals and unsharp black signals to mask the sharp color signals and sharp black signals. However, with some forms of black signal this is not necessary, since if the color channels are unsharply masked before the greatest of the three signals is selected to establish the black signal, the black signal itself will inherently involve unsharp masking.

Still a fifth peculiarity of this combination of color correction and unsharp masking is the fact that subsequent masking of the color signals by the black signal, even though all four are unsharply masked at this stage, does not appreciably reduce the unsharp masking of the color signals.

A sixth peculiarity of the combination comes from the order of importance of the four signals with respect to detail in the final print. The black printer has the most effect on detail, and therefore it is most important to provide unsharp masking in the block signal. The cyan and magenta printers are the next most important, but the yellow printer has little effect on detail. Therefore it is more important to provide unsharp masking of the red and green signals than it is of the blue signal. This last point is the only one in which the optimum arrangement for color correction is not also the optimum arrangement for unsharp masking. Color correction involves masking of the blue more than the red or the green signal, whereas unsharp masking is not too interested in the blue signal. However, masking of red by red is customary, although it effects no color correction, in order to maintain equal contrast in the three signals, and this masking may be made unsharp.

A seventh unexpected feature of the four-color embodiments is the fact that useful results are obtained even if one of the primary color channels is not unsharply masked and thus the black printer is unsharply masked only at those points of the picture which are predominantly one of the other two primary colors.

Finally in this general discussion of the combination of unsharp masking and the color correction, one should mention the possibility of providing color correction of one sharp signal by another sharp signal and the possibility of omitting any correction of the color signals by the black signal since the error introduced thereby appears only as increased color contrast which in some cases is commercially acceptable. In practice the black printer density is only a fraction of the ideal and the color printer densities are reduced by only a fraction of this fraction.

The detailed description of Figs. 17–23 will now be given.

Fig. 17 is identical to Fig. 1 and therefore requires no separate description. The reference numerals are the same in both figures. To provide the maximum useful color correction, the lead wire from 37RU to 38RU could be replaced by one from 37GU to 38R and another lead could be added to run from 37RU to 38B. However, the correction of blue by green and green by red is the most important. For the sake of generality in Figs. 1 and 17, therefore, the correction of red by red is illustrated (which is useful for maintaining color balance). That is, there would be no point in correcting green by green since it has to be corrected by red anyway, and there would be no point in correcting blue by blue since it has to be corrected by green. Therefore the most useful illustration of correcting one color by itself involves correcting red by red, and therefore this arrangement has been selected in Figs. 1 and 17. In some cases however, the masking of red by green required to provide color correction is actually high enough to provide a useful degree of unsharp masking. In those cases where this masking factor for color correction is too small to be useful in unsharp masking, one must use some such arrangement as that shown in Figs. 1 and 17 in order to get a useful degree of unsharp masking of the red signal.

The reason for including Fig. 17 which is a repetition of Fig. 1, but omitting the optical part of the system, is merely to permit direct comparison therewith when considering the subsequent figures. This greatly simplifies the descriptions of Figs. 18 to 23. Obviously, the essential features of Figs. 18 to 23 would be obscure if the optics were repeated and re-described in connection with each one of these figures, especially since this would require the figures to be on separate pages so that direct comparison would not be convenient.

Fig. 18 is similar to Fig. 17 except that a "horsepower" method of introducing unsharp masking is provided. In mixers 51R, 51G and 51B, each color signal is unsharply masked by its own color, the masking signals being respectively provided by inverter rectifiers 50RU, 50GU and 50BU. As in Fig. 17, a black selector 39 selects the maximum of the signals from the mixers 51R, 51G, and 51B. A second black selector 52 selects the maximum of the three unsharp signals from amplifiers 36RU, 36GU and 36BU. This unsharp black signal is fed through an inverter rectifier 57 into a mixer 53 to modify the unsharply masked black signal from the selector 39. This system would be just as effective if the selector 39 made its selection before the color signals were unsharply masked in the mixers 51R, G and B. However, for generality, Fig. 18 provides the unsharp masking of the black signal in two stages, first in the separate color signals and then again in the black channel. Color correction is provided by exponential amplifiers 54R, G and B in the respective color channels. Part of the output from 54R is fed through an inverter rectifier 55R to a mixer 56G in the green channel, and part of the output of the amplifier 54G is fed through an inverter rectifier 55G to a mixer 56B in the blue channel. Otherwise the circuit of Fig. 18 is identical to that of Fig. 17. The color correction could be provided in the color channels ahead of the unsharp masking, i. e. ahead of the mixers 51R, G and B. Also as pointed out above elements 52, 53 and 57 can be omitted providing selector 39 receives its input from the unsharply masked signals, as shown, rather than ahead of the unsharp masking stage.

Fig. 19 is identical to Fig. 17 except for the fact that the only unsharp signal established is the red one and the fact that the blue signal is masked by a sharp rather than an unsharp green signal. To accomplish this, part of the output of the exponential amplifier 36GS is fed through an inverter rectifier 60 to a mixer 61 in the blue channel. As far as the blue signal is concerned, very little is lost by this simplification since the blue signal controls the yellow printer and the yellow printer has negligible effect on detail reproduction. That is, the blue signal might just as well be sharply masked as unsharply masked. There is one point where, at least theoretically, this simplified arrangement may be a disadvantage. The black signal selector 39 operates on the greatest of the three signals which it receives from the mixers 38R, 38G and 61. In those parts of the original which are predominantly red or green, the black signal will be unsharply masked, but those parts which are predominantly blue will have only a sharply masked black signal. Thus the blue parts of the picture will not have the enhanced detail provided by unsharp masking. Nevertheless, Fig. 19 represents a practical system for some purposes.

Fig. 20 is identical to Fig. 19 except that the black printer is omitted entirely. Thus Fig. 20 does not have the theoretically possible disadvantage just described in connection with Fig. 19. In other words, this simplification requiring only one unsharp signal, the red one, is eminently satisfactory in three-color processes. Of course, if four-color processes are required, one must go to the arrangement shown in Fig. 19 or to one of the other arrangements.

Fig. 21 differs from Fig. 17 merely by the omission of the mixer 38R and the omission of the correction of red by red. This simplification also is a practical one although detail is not improved in the cyan printer and is not improved in the black printer in those areas of the original which are predominantly red. Detail is improved in the yellow printer which is unnecessary and in the magenta printer and in the black printer with respect to all areas which are predominantly green or blue. Actually this system gives very useful results.

Fig. 22 is similar to Fig. 18 except that the black selector 39 receives its signals from the sharp color amplifiers 36RS, GS and BS, and color correction is provided only by sharp signals in the mixers 56G and B. An unsharp black signal is set up by a filter 65 which may be either yellow or infrared transmitting, depending on which type of "black" is desired. The unsharp light beam through the filter 65 strikes a photo-electric cell 66 whose output is amplified by an exponential amplifier 67 and then rectified and inverted in an inverter rectifier 68 before masking the output of the black selector 39 in mixer 53. Thus, in Fig. 22, only the black signal is unsharply masked. This is useful, since the black printer is the most effective one with respect to detail in the final print. The selector 52 and inverter rectifier 57 system of Fig. 18 can replace the unsharp black signal channel (65 to 68) of this Fig. 22.

Fig. 23 provides a variation of this in which an unsharp black signal is set up in a selector 70 which also corresponds to the selector 52 in Fig. 18. This unsharp black signal is then fed to an inverter rectifier 71 whose output serves two purposes. First, it provides unsharp masking of the black signal in mixer 53 and secondly it provides unsharp masking of the color signals in mixers 72R, G and B respectively. The unsharp masking of the color signals should be a direct function of the intensity of the black signal since the color printers should be reduced in density by the amount printed by the black printer at any one point. Therefore the greater the black signal from selectors 39 and 70 (these signals will increase and decrease together since the only difference between them is that one is sharp and the other unsharp) the more masking is required in mixers 72R, G and B. The masking factor in mixer 53 remains constant and thus even though the masking in mixer 53 increases with increase of signal from 71, the output of mixer 53 is greater when the output of inverter rectifier 71 is greater because the output of selector 39 has also increased. Therefore it is proper to feed increased (or decreased) signals from the inverter rectifier 71 both to mixer 53 and to the mixers 72R, G and B.

These color correction systems in Figs. 17–23 are interchangeable with the electrical system of Fig. 1. The means of providing the correction of one signal by another is in many cases also interchangeable with that shown in Figs. 4 and 5. The various systems shown in Figs. 6–16 may be used for providing the sharp and unsharp signals simultaneously or alternately at high frequency. This manner of describing the present invention has been chosen to eliminate confusion. Obviously if each of the methods of providing sharp and unsharp signals set forth in Figs. 6–16 were illustrated with each of the color correction systems shown in Figs. 17–23 and then each of these systems were shown with both electrical correction and correction by light valves in optical tandem, this specification would become quite confusing. The preferred system is set forth in Fig. 1 and the alternatives first for getting unsharp and sharp signals and second for using these signals for correction one by the other are discussed separately with reference to the other figures.

I claim:

1. In an electro-optical reproduction system, the combination of optical means for scanning a pictorial record both sharply and unsharply substantially simultaneously, means responsive to the sharp scanning for establishing a first electric signal corresponding to finely detailed variations in the record and means responsive to the unsharp scanning for establishing a second electric signal corresponding to less finely detailed variations in the record and means for scanning synchronously with the scanning of the record a photosensitive layer by a light beam whose intensity varies according to the first electric signal inversely modified by the second electric signal.

2. The combination according to claim 1 including electric modulator means connected to both signal establishing means for modifying the first signal by the second signal.

3. The combination according to claim 1 in which the light beams of the sharp and unsharp scanning are interrupted at different carrier frequencies and in which the two signal establishing means include a common photoelectric cell for receiving both the sharp and unsharp scanning beams and respectively include electrical filters for blocking from each signal establishing means the carrier frequency of the other scanning beam.

4. The combination according to claim 1 in which the means for scanning the pictorial record is a single one producing the sharp and unsharp scanning alternately at a carrier frequency higher than the signal frequency from scanning finely detailed variations in the record and in which the two signal establishing means include two electric channels, a common photoelectric cell and switching means operated in synchronism with said carrier frequency for directing the output of the common photoelectric cell alternately to the two electric channels.

5. The combination according to claim 1 in which the sharp and unsharp scanning of the pictorial record are through different primary color filters, the primary color of the unsharp beam being one which provides color correction to the primary color of the sharp beam when the latter color is masked by the former.

6. The method of electro-optical reproduction of a picture or scene as a picture which comprises point scanning one and the same line of a pictorial record of the picture or scene both sharply and unsharply substantially simultaneously, establishing a first electric signal in accordance with the response of said sharp scanning, establishing a second electric signal in accordance with the response of said unsharp scanning, point scanning synchronously with the scanning of the record a photosensitive layer by a light beam, and modulating the intensity of the latter light beam in accordance with the intensity of the first electric signal divided by the intensity of the second electric signal.

7. The method according to claim 6 including the step of interrupting said sharp and unsharp scanning at different carrier frequencies and in which said signal establishing includes electrically filtering into two electric channels, the output of a single photoelectric cell receiving both beams.

8. The method according to claim 6 in which said sharp and unsharp scanning are done alternately at a carrier frequency greater than that provided by scanning finely detailed variations in the record.

9. The method according to claim 6 in which said sharp and unsharp scanning are respectively through primary color filters, the one for the unsharp scanning being a color which corrects the one for the sharp scanning when the latter is masked by the former and including the step of amplifying the first and second electric signals to exponents whose ratio is the masking factor required for color correction, prior to said division.

10. An electro-optical reproduction system comprising means for scanning a pictorial record both by a sharp light beam and an unsharp light beam substantially simultaneously, photoelectric means for receiving the two beams and for establishing from the intelligence in the sharp beam a first electric signal corresponding to finely detailed variations in the record, and from the intelligence in the unsharp beam a second electric signal corresponding to less finely detailed variations in the record, means for scanning synchronously with the scanning of the record a photosensitive layer by a light beam and means for varying the intensity of the latter beam in accordance with the intensity of the first electric signal divided by the intensity of the second electric signal.

11. An electro-optical reproduction system according to claim 10 in which said scanning means includes means for illuminating a portion of the pictorial record and apertured means for receiving light from said portion and dividing it into two beams representative respectively of a sharp spot and an unsharp spot including the sharp spot on the record.

12. An electro-optical reproduction system according to claim 10 in which the scanning means includes means for illuminating an area at least as large as an unsharp spot on the pictorial record, an objective for receiving light from said area for forming a magnified image of the area, a beam-splitter for receiving light from the objective and splitting it into two beams thus doubling said image and forming it at two different planes, diaphragm means at one of said planes with a small aperture for transmitting only that part of the image corresponding to a sharp spot on the record and diaphragm means at the other of said planes with an aperture of slightly greater diameter for transmitting that part of the image corresponding to an unsharp spot on the record.

13. An electro-optical system according to claim 10 in which the scanning means includes means for illuminating only an unsharp spot on the pictorial record, an objective for focusing an image of said spot on a reflector having a small aperture for transmitting only that part of the image corresponding to a sharp spot on the record within said unsharp spot and in which said photoelectric means includes one photoelectric cell for receiving the light transmitted through said small aperture containing the intelligence of the sharp beam and a second photoelectric cell receiving light reflected by the reflecting means and containing the intelligence in the unsharp beam.

14. An electro-optical reproduction system according to claim 10 in which said scanning means including a source of light of small area and concentrically bifocal lens means for receiving light from said source and focusing two axially spaced images thereof, the one from the paraxial region of said lens means being on the record and covering only a sharp spot thereon and the other, from the marginal region of the lens means, being out of focus in the record and covering an unsharp spot thereof including said sharp spot and in which said photoelectric means includes one photoelectric cell positioned to receive light only from the paraxially formed image and a second photoelectric cell positioned to receive only the annular beam passing through the pictorial record at higher obliquity than the paraxial beam and corresponding to the unsharp spot.

15. An electro-optical reproduction system according to claim 10 in which said sharp and unsharp light beams are polarized differently and including polarizing beam-splitting means for separating the two beams after transmission through the record and before being picked up by said photoelectric means.

16. An electro-optical reproduction system according to claim 15 in which the sharp and unsharp beams are plane polarized at right angles to each other.

17. An electro-optical reproduction system comprising means for scanning a pictorial record both by a sharp light beam and an unsharp light beam alternately at a frequency higher than the signal frequency from scanning the finest detailed variations in the record, a photoelectric cell for receiving the two beams, two electric channels, switching means for receiving the output of the photoelectric cell and for switching it synchronously with said alternating frequency alternately to the two channels to establish in one channel from the intelligence in the sharp beam a first electric signal corresponding to finely detailed variations in the record and in the other channel from the intelligence in the unsharp beam a second electric signal corresponding to less finely detailed variations in the record, means for scanning synchronously with the scanning of the record a photosensitive layer by a light beam and means for varying the intensity of the latter beam in accordance with the intensity of the first electric signal divided by the intensity of the second electric signal.

18. An electro-optical reproduction system according to claim 17 in which said scanning means includes a small source of light, alternative reflecting systems for receiving light from said source and directing it toward the record, an objective for receiving the reflected light and for focusing on the record an image of the source which is sharp when the light is reflected from one of said reflectors and unsharp when it is reflected from the other of said reflectors, and means for alternating the two reflectors in the light beam.

19. An electro-optical system according to claim 17 in which said scanning means includes diaphragming means with light transmitting apertures of varying diameter, means for illuminating said apertures, an objective for receiving light from the apertures and for focusing an image thereof on the record and in which said switching means includes a photoelectric cell positioned to receive a light beam whose intensity is varied synchronously with variations in said illuminated aperture.

20. An electro-optical reproduction system according to claim 17 in which said scanning means includes a small source of light, an objective having a bi-refringent element for forming two images of said source, one sharply and the other unsharply on the record, means for alternately changing the polarization of the light from said source from light polarized to give only said sharp image to light not so polarized and in which said switching means is operated synchronously with said polarization changer.

21. An electro-optical color reproduction system comprising means for scanning a pictorial record substantially simultaneously both by a sharp light beam of one primary color and an unsharp light beam of a different primary color which provides color correction when the former is masked by the latter, photoelectric means for receiving the two beams and for establishing from the intelligence in the sharp beam a first electric signal corresponding to finely detailed variations in said one primary color in the record, and from the intelligence in the unsharp beam a second electric signal corresponding to less finely detailed variations in said other color in the record, two electric channels for respectively carrying the first and second electric signals and for amplifying them to exponents whose ratio is the masking factor required for said color correction, means for scanning synchronously with the scanning of the record a photosensitive layer by a light beam and means for varying the intensity of the latter beam in accordance with the first electric signal as exponentially amplified, divided by the second electric signal as exponentially amplified.

22. An electro-optical color reproduction system according to claim 21 including means for establishing sharp electric signals according to each of the three primary colors, means for establishing unsharp electric signals corresponding to at least one of the primary colors, separate electric modulator means connnected to each of the sharp signal means and to at least one unsharp signal means for modifying each of the sharp signals by at least one unsharp signal, and electrical selector means for receiving the signals from the three electric modulator means and for selecting the signal of greatest intensity and a fourth electric channel connected to said selector means for establishing a black printer signal proportional to the greatest of the three primary color signals as modified.

23. An electro-optical color reproduction system according to claim 21 including means for establishing three sharp electric signals corresponding to the three primary colors, means for establishing an unsharp electric signal corresponding to primary red, and two electric modulator means respectively for receiving the sharp red signal and the sharp green signal and for modifying each of them in accordance with the unsharp signal.

24. An electro-optical color reproduction system comprising means for scanning a pictorial record both by a sharp light beam and an unsharp light beam substantially simultaneously, means including beam-splitters and photoelectric cells for receiving the sharp beam and for establishing electric signals corresponding to finely detailed variations in the three primary colors respectively in the record, means for receiving the unsharp beam and for establishing a masking electric signal corresponding to less finely detailed variations in the record, electric selector means for establishing a black signal in accordance with the greatest of the three color signals, means for modifying the sharp signals in accordance with the masking signal, means for scanning synchronously with the scanning of the record four photosensitive layers by light beams whose intensity is respectively in accordance with the three color signals and the black signal as modified.

25. The method of electro-optical reproduction of a picture or scene as a picture which comprises point scanning one and the same line of a pictorial record of the picture or scene with a light beam, alternately sharply and unsharply at a frequency higher than the signal frequency from scanning finely detailed variations in the record, receiving the light from the record and photoelectrically establishing electric signals corresponding to the intelligences in the light beams, switching the photoelectric output alternately, synchronously with said alternating frequency, to two electric channels for establishing electric signals respectively corresponding to finely detailed variations and less finely detailed variations in the record, point scanning synchronously with the scanning of the record a photosensitive layer by a light beam and varying the intensity of the latter beam in accordance with the first electric signal divided by the second electric signal.

26. The method of electro-optical color reproduction of a colored picture or scene as a colored picture which comprises point scanning one and the same line of a pictorial record of the picture or scene by a sharp light beam, establishing electric signals corresponding to the variations in the primary colors in said sharp light beam, substantially simultaneously scanning the record with an unsharp light beam, establishing electric signals corresponding to at least one primary color in the unsharp light beam, electrically modulating at least one of the sharp signals by the unsharp signal, synchronously point scanning three photosensitive layers by light beams and varying the intensity of the light beams respectively in accordance with the intensity of the sharp primary color signals as inversely modified by the unsharp signal.

27. The method according to claim 26 including the additional steps of selecting the greatest of the three primary color signals as modified and scanning a fourth photosensitive layer by a light beam varied in accordance with the intensity of the greatest signal so selected.

28. The method of electro-optical color correction in the reproduction of a color picture or scene as a color picture which comprises point scanning a line of a pictorial record of the picture or scene by a sharp light beam, photoelectrically establishing electric signals respectively corresponding to the three primary colors in said sharp beam, substantially simultaneously point scanning the same line of the pictorial record by an unsharp light beam, photoelectrically establishing at least one masking signal corresponding to a color in said unsharp light beam, selecting the greatest of the three primary color signals to form a black signal, electrically modifying at least one of the three color and black signals by said unsharp signal, point scanning synchronously with the scanning of the record four photosensitive layers by light beams and varying the intensity of the light beams in accordance with the intensity of the three primary color signals and the black signal as modified.

29. In electro-optical duplication of an image record of a picture or scene, the method of obtaining a photographic record which has been exposed in a manner equivalent to unsharp masking, which comprises simultaneously point scanning along one and the same line elemental areas and larger areas including the elemental areas of the image record, separately deriving electric signals corresponding, respectively, to the light modifying properties of the elemental areas and the larger areas, modifying the signal corresponding to the elemental areas in accordance with the signal corresponding to the larger areas, and utilizing the resulting signal to control the exposure of a photographic layer.

30. In electro-optical color correction systems for reproducing a multicolored original, scanning means for producing the effect of unsharp masking of the printer negatives comprising a source of illumination, means for deriving main electric signals corresponding to the primary color components of the light modified by elemental scanning areas of the original, means for deriving auxiliary electric signals corresponding to the primary color components of the light modified by slightly larger areas including the elemental scanning areas of the original, means for modifying at least one main electric signal in accordance with at least one auxiliary electric signal, means for selecting the maximum of the three main signals as so modified, means for secondarily modifying said main signals as so modified in accordance with said maximum signal, four photosensitive layers, and means for controlling the exposure of the four photosensitive layers, in synchronism with the scanning of the original, in accordance, respectively, with the three secondarily modified signals and said maximum signal.

31. In a method of reproducing a colored picture in color, the steps of scanning identical areas of said colored picture with scanning areas of different sizes to provide first electric signals representative of relatively finely detailed variations in a color of said subject and second electric signals representative of relatively less finely detailed variations in another color of said subject, respectively, and modifying said first electric signals in accordance with said second electric signals.

32. In a method of reproducing a colored picture in color, the steps of scanning areas of said colored picture with a scanning aperture of relatively large size to provide first electric signals representative of relatively coarsely detailed variations in a color of said subject, selecting a relatively smaller area of the portion of the subject viewed by said scanning aperture, utilizing said smaller area to provide second electric signals representative of relatively finely detailed variations in a color of said subject, and modifying one of said first and second electric signals by the other of said signals.

33. In a method of reproducing a colored picture in color, the steps of scanning areas of said colored picture with a scanning aperture of relatively large size to provide a light beam representative of relatively coarsely detailed variations in a color of said subject, producing first electric signals varying in correspondence with variations in said light beam, masking off the edges of said beam to confine it to a portion only of the area of the subject viewed by said scanning aperture to produce a modified beam representative of relatively finely detailed variations in another color of said subject, producing second electric signals varying in correspondence with variations in said modified beam, and modifying said second electric signals by said first electric signals.

34. In a system for scanning a subject embodying intelligence to be scanned, the combination of scanning means for producing a single light beam representative of variations in said intelligence to be scanned, photosensitive means for producing a first electric signal varying in correspondence with said light beam, masking off means for selecting a portion of the light in said beam representing a portion only of the area of the subject viewed by said scanning means, photosensitive means for producing a second electric signal varying in correspondence with said selected portion of the light beam, and means for inversely modifying said second electric signal by said first electric signal.

35. In an electronic system for making reproductions of a colored original, the combination of scanning means having a relatively large scanning aperture for providing a single light beam representative of relatively coarsely detailed variations in a color of said original, photosensitive means for providing a first electric signal varying in correspondence with variations in one primary color in said light beam, masking off means for transmitting only a portion of the light in said beam representative of relatively finely detailed variations in a different primary color of said original, photosensitive means for providing a second electric signal varying in correspondence with variations in said light beam portion, and means for inversely modifying said second electric signal by said first electric signal, said one primary color being one which provides color correction to said different primary color when the latter is masked by the former.

36. In the electro-optical reproduction as a picture of a pictorial record of a picture or scene, the method comprising simultaneously point scanning one and the same line of the record sharply and unsharply, deriving separate electric signals from the two scannings, and modulating the intensity of a recording light beam in accordance with the ratio between the intensities of the two scansion currents.

37. In the electro-optical reproduction as a picture of a pictorial record of a picture or scene, the method comprising simultaneously point scanning one and the same line of the record sharply and unsharply, deriving separate electric signals from the two scannings, and modulating the intensity of a recording light beam in accordance with the quotient of the intensity of the signal current derived from the sharp scansion divided by the intensity of the signal current derived from the unsharp scansion.

References Cited in the file of this patent

UNITED STATES PATENTS

| Number | Name | Date |
|---|---|---|
| 1,855,196 | Offenhauser | Apr. 26, 1932 |
| 1,901,033 | Karolus | Mar. 1, 1933 |
| 1,901,034 | Karolus | Mar. 14, 1933 |
| 2,253,086 | Murray | Aug. 19, 1941 |
| 2,286,730 | Hall | June 16, 1942 |
| 2,313,542 | Hall | Mar. 9, 1943 |
| 2,313,543 | Hall | Mar. 9, 1943 |
| 2,415,051 | Thompson | Jan. 28, 1947 |
| 2,455,849 | Yule | Dec. 7, 1948 |
| 2,567,240 | Sites | Sept. 11, 1951 |
| 2,606,245 | Hall | Aug. 5, 1952 |